United States Patent
Gupta et al.

(10) Patent No.: US 12,062,176 B2
(45) Date of Patent: Aug. 13, 2024

(54) GENERATING CHANGE COMPARISONS DURING EDITING OF DIGITAL IMAGES

(71) Applicant: Adobe Inc., San Jose, CA (US)

(72) Inventors: Angad Kumar Gupta, Ghaziabad (IN); Gagan Singhal, Shakur Basti (IN)

(73) Assignee: Adobe Inc., San Jose, CA (US)

( * ) Notice: Subject to any disclaimer, the term of this patent is extended or adjusted under 35 U.S.C. 154(b) by 285 days.

(21) Appl. No.: 17/087,086

(22) Filed: Nov. 2, 2020

(65) Prior Publication Data

US 2022/0138950 A1    May 5, 2022

(51) Int. Cl.
| | |
|---|---|
| *G06T 7/11* | (2017.01) |
| *G06T 7/254* | (2017.01) |
| *G06T 7/90* | (2017.01) |
| *G06T 11/60* | (2006.01) |

(52) U.S. Cl.
CPC ............... *G06T 7/11* (2017.01); *G06T 7/254* (2017.01); *G06T 7/90* (2017.01); *G06T 11/60* (2013.01); *G06T 2207/10024* (2013.01); *G06T 2207/20084* (2013.01)

(58) Field of Classification Search
CPC ... G06T 7/11; G06T 7/254; G06T 7/90; G06T 11/60; G06T 2207/10024; G06T 2207/20084; G06T 7/194; G06T 7/12; G06T 5/50; G06T 2207/20221; G06V 10/761; H04N 1/6008; H04N 1/6016
See application file for complete search history.

(56) References Cited

U.S. PATENT DOCUMENTS

| | | | | |
|---|---|---|---|---|
| 4,893,195 A | * | 1/1990 | Tada | H04N 1/40075 |
| | | | | 358/453 |
| 5,638,498 A | * | 6/1997 | Tyler | G06T 9/005 |
| | | | | 358/1.18 |
| 6,480,624 B1 | * | 11/2002 | Horie | G06T 5/002 |
| | | | | 382/163 |
| 6,757,006 B1 | * | 6/2004 | Yabe | H04N 7/18 |
| | | | | 382/164 |
| 7,982,747 B1 | * | 7/2011 | Dulaney | H04N 1/32101 |
| | | | | 382/311 |
| 9,148,639 B2 | * | 9/2015 | Madonna | H04N 5/272 |
| 2005/0097120 A1 | * | 5/2005 | Cooper | G06F 16/58 |
| | | | | 707/999.102 |

(Continued)

FOREIGN PATENT DOCUMENTS

WO    WO-2009081623 A1 *  7/2009  ............. G06T 11/00

*Primary Examiner* — Manav Seth

(74) *Attorney, Agent, or Firm* — Keller Preece PLLC

(57) ABSTRACT

The present disclosure describes systems, non-transitory computer-readable media, and methods for detecting and indicating modifications between a digital image and a modified version of a digital image. For example, the disclosed systems generates an ordered collection of change records in response to detecting modifications to the digital image. The disclosed systems generates determine one or more non-contiguous modified regions of pixels in the digital image based on the change records. The disclosed system generate an edited region indicator corresponding to the non-contiguous modified regions. The disclosed systems can further color-code the edited region indicator at an object level based on objects in the modified version of the digital image.

20 Claims, 14 Drawing Sheets

(56) References Cited

U.S. PATENT DOCUMENTS

| | | | | |
|---|---|---|---|---|
| 2009/0062944 | A1* | 3/2009 | Wood | G06F 16/48 |
| | | | | 700/94 |
| 2009/0231467 | A1* | 9/2009 | Yamashita | H04N 23/76 |
| | | | | 348/E9.053 |
| 2009/0315996 | A1* | 12/2009 | Guler | H04N 7/183 |
| | | | | 348/169 |
| 2010/0226564 | A1* | 9/2010 | Marchesotti | G06F 16/51 |
| | | | | 382/159 |
| 2011/0044558 | A1* | 2/2011 | Clediere | H04N 5/253 |
| | | | | 382/275 |
| 2012/0081386 | A1* | 4/2012 | Wiemker | G06T 19/00 |
| | | | | 345/611 |
| 2013/0120442 | A1* | 5/2013 | Dhawan | G06T 3/0012 |
| | | | | 382/162 |
| 2013/0153663 | A1* | 6/2013 | Yang | G06K 7/1443 |
| | | | | 235/462.08 |
| 2013/0239051 | A1* | 9/2013 | Albouze | G06T 11/60 |
| | | | | 715/810 |
| 2013/0321460 | A1* | 12/2013 | Linburn | G06T 11/60 |
| | | | | 345/630 |
| 2014/0330911 | A1* | 11/2014 | Hunter | H04L 67/52 |
| | | | | 709/206 |
| 2015/0371422 | A1* | 12/2015 | Kokemohr | G06T 11/60 |
| | | | | 382/311 |
| 2018/0365813 | A1* | 12/2018 | Leong | G06T 7/11 |
| 2019/0095739 | A1* | 3/2019 | Gao | B60K 37/02 |
| 2019/0332893 | A1* | 10/2019 | Roy Chowdhury | G06T 7/11 |
| 2020/0311408 | A1* | 10/2020 | Asai | G06V 30/412 |
| 2020/0372659 | A1* | 11/2020 | Hagiopol | G06T 7/564 |
| 2020/0394827 | A1* | 12/2020 | Morita | G06T 5/50 |
| 2021/0012102 | A1* | 1/2021 | Cristescu | G06V 30/412 |

* cited by examiner

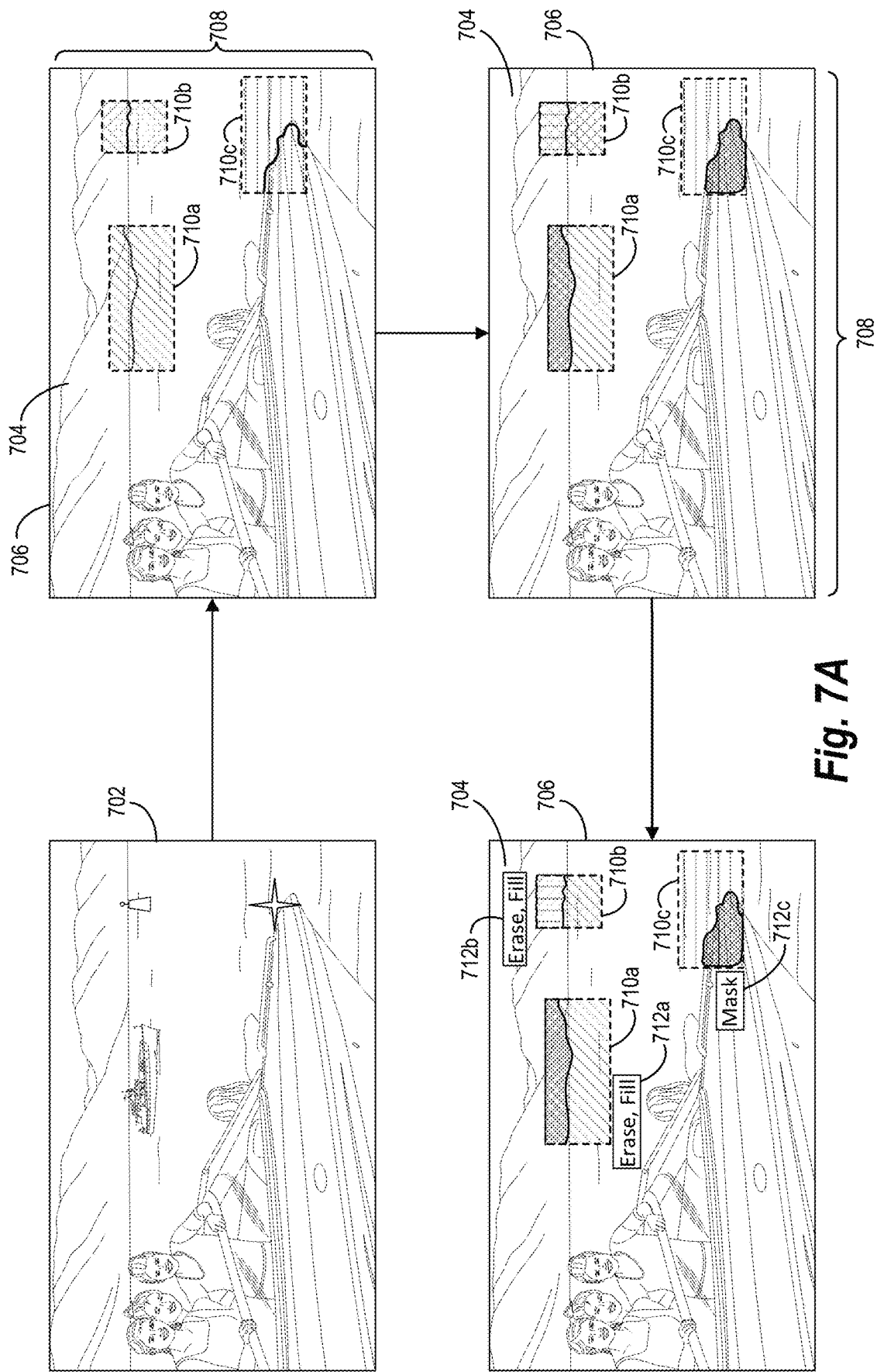

GENERATING CHANGE COMPARISONS DURING EDITING OF DIGITAL IMAGES

BACKGROUND

Recent years have seen significant improvements in digital image editing. For example, conventional image editing systems enable users edit and/or modify a digital image in any of a number of ways. Utilizing editing and modification tools provided by conventional systems, users are often able to produce professional quality digital images. Despite this, users often apply edits to a digital image that result in unintended modifications. For example, in an attempt to make a person's leg in a digital image appear slimmer, a user may unintentionally cause a door frame in the background of the digital image to become warped. In another example, in an attempt to remove an unwanted object from the digital image, the user may unintentionally leave a portion of the unwanted object behind.

Conventional image editing systems only provide limited approaches in an effort to help identify these unintended modifications. For example, some conventional systems determine a Mean Square Error (MSE) between a digital image and a modified version of the digital image to determine pixel-level differences between the two images. Other conventional systems determine a Structural Similarity Index (SSIM) between the digital image and a modified version of the digital image to determine pixel-level similarities between the two images.

Despite this, both the MSE and SSIM approaches suffer from multiple issues with regard to accuracy, flexibility, and efficiency of operation in identifying unintended modifications between a digital image and a modified version of the digital image. For example, MSE and SSIM approaches are inaccurate. Specifically, MSE often outputs scores that are arbitrarily high and unstandardized. And while SSIM outputs are normalized between −1 and 1, SSIM is incapable of accurately determining a modification operation that resulted in any differences between the digital image and the modified version of the digital image. Additionally, neither MSE nor SSIM give any indication of specific objects or areas in the digital image that were modified to produce the modified version of the digital image. Rather, both of the MSE and SSIM approaches are limited to determining a single global difference score between two images.

Furthermore, both MSE and SSIM are inflexible. For example, as mentioned, both approaches rigidly determine a net difference between two digital image. Thus, neither approach is flexible enough to make object-level determinations indicating whether single objects or confined areas of a digital image have experienced a modification. Accordingly, when a user is applying multiple intended modifications to a digital image, neither MSE nor SSIM is flexible enough as to indicate whether any of those intended modifications resulted in an unintended modification. Instead, both MSE and SSIM would only unhelpfully indicate that the digital image was indeed modified to a specified extent (e.g., as indicated by a score).

Moreover, MSE and SSIM inefficiently utilize computing resources. For example, as discussed above, the MSE approach identifies pixel-level differences between two digital images while the SSIM approach identifies pixel-level similarities between two digital images. Both approaches operate on entire digital images, rather than on areas of digital images or objects within digital images. Accordingly, when applied to large digital images (e.g., in terms of size and/or pixel density), both MSE and SSIM drain processing cycles and storage resources—even if there is only one slight modification between the digital images.

These along with additional problems and issues exist with regard to conventional image editing systems.

BRIEF SUMMARY

Embodiments of the present disclosure provide benefits and/or solve one or more of the foregoing or other problems in the art with systems, non-transitory computer-readable media, and methods for detecting and indicating modifications between digital images and modified version of digital images that highlight potential unintended modifications. The disclosed systems generate change records for monitored modifications associated with a digital image. The disclosed systems utilize areas of modified pixels denoted by the generated change records to determine one or more non-contiguous modified regions associated with the digital image. Additionally, the disclosed systems generate an edited region indicator (e.g., an outline or overlay) based on the one or more non-contiguous modified regions. Optionally, the edited region indicator includes color-coded object-level subdivisions. The disclosed systems then display the modified version of the digital image with the edited region indicator positioned so as to provide an intuitive overview of modifications made to the digital image allowing a user can quickly and easily identify potentially unintended modifications that should be corrected or removed.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 7A illustrates the digital-image modification detection and indication system generating a visual comparison between a digital image and a modified version of the digital image in accordance with one or more embodiments.

DETAILED DESCRIPTION

Figure 1:
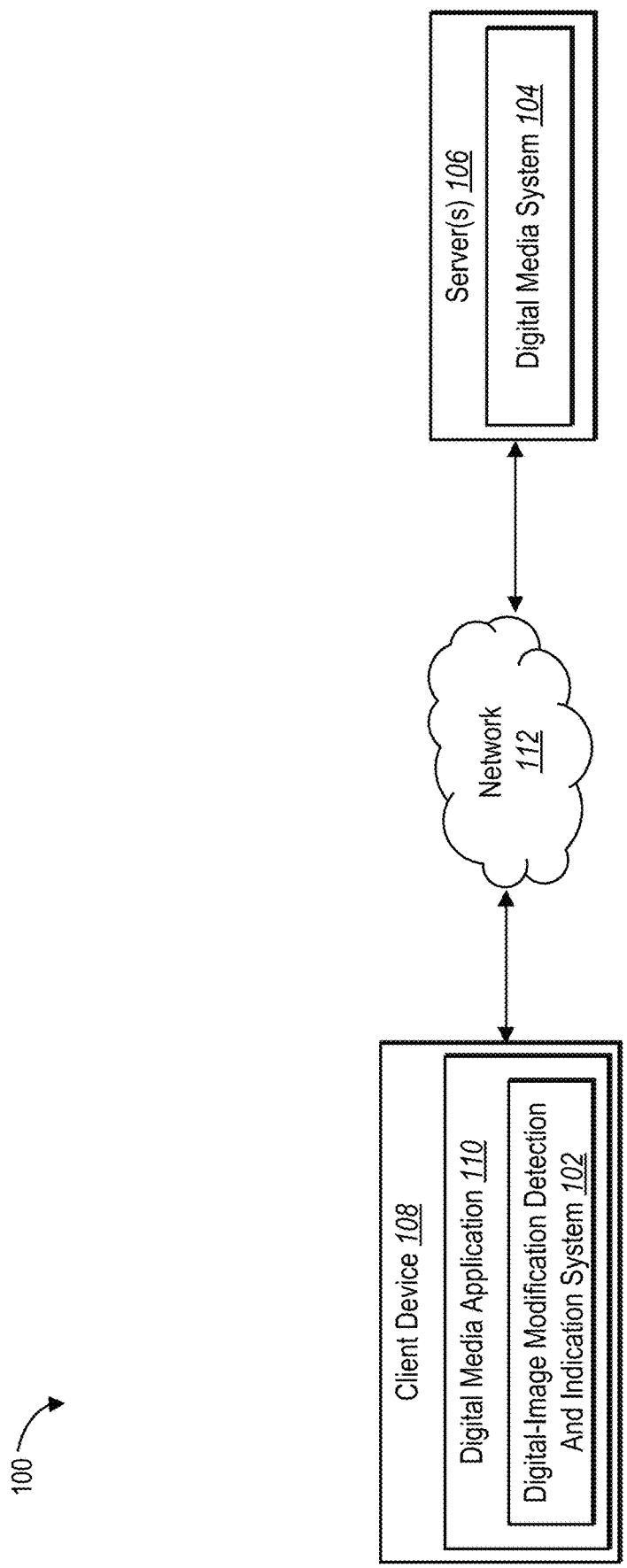
FIG. 1 illustrates a schematic diagram of an environment in which a digital-image modification detection and indication system operates in accordance with one or more embodiments.

This disclosure describes one or more embodiments of a digital-image modification detection and indication system that detects modifications of a digital image relative to a modified version of the digital image and visually indicates the modifications to enable a user to determine if undesired changes have been made. More specifically, the digital-image modification detection and indication system generates or access changes records indicating the modifications made to the digital image. In one or more embodiments, the digital-image modification detection and indication system determines overlaps between areas of modified pixels based on the change records in order to determine non-contiguous modified regions of modified pixels. In at least one embodiment, the digital-image modification detection and indication system further generates an edited region indicator have a size and shape corresponding to a non-contiguous modified region of modified pixels. Additionally, in at least one embodiment, the digital-image modification detection and indication system optionally subdivides the edited region indicator at an object level to allow a user to determine edits made to each object within the non-contiguous modified region to further highlight potentially unintended modifications. By positioning the edited region indicator on the modified version of the digital image, the digital-image modification detection and indication system intuitively illustrates to the user areas of modified pixels in the digital image that resulted in the modified version of the digital image. Thus, the digital-image modification detection and indication system also highlights any unintended modifications (e.g., "Photoshop fails") in the modified version of the digital image to the user.

As mentioned above, in one or more embodiments, the digital-image modification detection and indication system monitors edits and/or modifications in connection with a digital image to generate change records. As an example, the digital-image modification detection and indication system detects a modification to a digital image that smooths or blurs colors and lines in the digital image within an area of pixels. In response to detecting this modification, the digital-image modification detection and indication system generates a change record that includes the area of modified pixels (e.g., vertices of a polygon) relative to the digital image, and a modification operation that resulted in the area of modified pixels (e.g., smooth, blur, crop, fill).

In one or more embodiments, the digital-image modification detection and indication system disregards or otherwise ignores specific types of modifications to provide more effective indications of potential undesired modifications. For example, in one embodiment, the digital-image modification detection and indication system disregards global modifications. In other words, in one embodiment, the digital-image modification detection and indication system does not generate (or disregards) a change record for a modification that modifies all of the pixels in the digital image (e.g., such as changing the digital image from color to black and white). Additionally, the digital-image modification detection and indication system optionally disregards certain modifications in response to receiving user input indicating that those modifications should not be included in the analysis (e.g., in response to detecting a user selection of a flag or option that "turns off" modification tracking).

In at least one embodiment, and in response to generating a change record associated with a digital image, the digital-image modification detection and indication system stores the change record in connection with the digital image. For example, the digital-image modification detection and indication system stores the generated change record as metadata associated with the digital image. In response to additional detected modifications to the digital image, the digital-image modification detection and indication system generates and stores additional change records as an ordered collection of change records within the metadata associated with the digital image. For instance, the digital-image modification detection and indication system adds generated change records to the collection in the same order in which corresponding modifications are detected.

In one or more embodiments, the digital-image modification detection and indication system provides one or more selectable comparison tools or options in connection with a modified version of the digital image. For example, in response to detecting at least one modification to the digital image resulting in a modified version of the digital image, the digital-image modification detection and indication system provides or activates a selectable comparison tool. In response to a detected selection of the comparison tool in connection with the modified version of the digital image, for example, the digital-image modification detection and indication system generates one or more edited region indicators that point out modifications between the digital image (e.g., the original and/or un-edited digital image) and the modified version of the digital image.

In one or more embodiments, the digital-image modification detection and indication system generates the edited region indicators based on the generated change records stored in connection with the digital image. For example, the digital-image modification detection and indication system generates non-contiguous modified regions relative to the digital image based on the areas of modified pixels included in the generated change records. To illustrate, the digital-image modification detection and indication system identifies a subset of overlapping areas of modified pixels to generate a single non-contiguous modified region. The digital-image modification detection and indication system further determines the one or more modification operations that resulted in the modifications associated with the non-contiguous modified region. Additionally, the digital-image modification detection and indication system identifies non-contiguous modified regions that represent single modifications that are isolated or non-overlapping with any other modifications.

The digital-image modification detection and indication system further generates an edited region indicator having a size and shape corresponding to a non-contiguous modified region. In at least one embodiment, for example, the digital-image modification detection and indication system generates a color-coded, translucent edited region indicator that corresponds to the non-contiguous modified region. In such embodiments, the digital-image modification detection and indication system generates edited region indicators including one or more translucent and/or color-coded masks, each representing a non-contiguous modified region of detected modifications to the digital image that resulted in the modified version of the digital image. In additional or alternative embodiments, the digital-image modification detection and indication system generates edited region indicators that are outlines of a non-contiguous modified region rather than a mask.

In at least one embodiment, the digital-image modification detection and indication system further subdivides the edited region indicators based on objects detected in the modified version of the digital image. For example, the digital-image modification detection and indication system utilizes an object detector to determine or detect one or more objects in the modified version of the digital image. The digital-image modification detection and indication system, for example, further color-codes the edited region indicators based on one or more objects over which each edited region indicator lays in the modified version of the digital image. To illustrate, the digital-image modification detection and indication system subdivides an edited region indicators into two sections each with a separate color in response to determining that the edited region indicator overlays an object (e.g., a basketball) against a wall in the modified version of the digital image. In particular, the digital-image modification detection and indication system applies a first color to the area of the edited region indicator overlaying the basketball, and a second color to the area of the edited region indicator overlaying the wall.

In one or more embodiments, the digital-image modification detection and indication system provides a visual comparison by positioning a generated edited region overlay (i.e., a collection of edited region indicators) on the modified version of the digital image. For example, the digital-image modification detection and indication system positions the generated edited region overlay such that the edited region indicators therein align with modified areas in the digital image that resulted in the modified version of the digital image. Thus, the color-coded edited region indicators in the edited region overlay in the visual comparison provide intuitive visual indicators of edited areas between the digital image and the modified version of the digital image—thereby making unintended modifications easier to spot.

In at least one embodiment, the digital-image modification detection and indication system further provides interactive features with the visual comparison. For example, the digital-image modification detection and indication system embeds modification operations in the edited region overlay that correspond with the non-contiguous modified regions represented by the edited region indicators therein. To illustrate, in one embodiment, the digital-image modification detection and indication system determines one or more modification operations that result in the areas of modification that make up a single non-contiguous modified region. Then, in response to detecting a user interaction with the edited region indicator in the visual comparison that corresponds with the non-contiguous modified region (e.g., a detected mouse-hover or click), the digital-image modification detection and indication system generates and provides a list of the determined modification operations. Thus, the digital-image modification detection and indication system provides the visual comparison that not only includes the areas of modification but also lists of modification operations that correspond with each indicated area.

As mentioned above, the digital-image modification detection and indication system provides many advantages and benefits over conventional image editing systems and methods. For example, the digital-image modification detection and indication system improves the accuracy of conventional image editing systems by generating an object-level visual comparison between a digital image and a modified version of the digital image rather than a global score reflecting a level to which a digital image is edited, as with tools utilized by conventional systems. More specifically, in response to detecting one or more modifications to a digital image, the digital-image modification detection and indication system generates a visual comparison that highlights the specific differences between the unedited digital image (e.g., the original digital image) and the modified version of the digital image. Thus, the digital-image modification detection and indication system generates a visual comparison that accurately and intuitively highlights specific objects and areas that have undergone some level of modification.

Additionally, the digital-image modification detection and indication system is more flexible than conventional image editing systems. For example, rather than the rigid, global approaches common to conventional systems, the digital-image modification detection and indication system flexibility identifies specific areas of change between two images. This flexibility leads to a greatly improved user experience as the digital-image modification detection and indication system highlights specific modifications—both intended and unintended—rather than simply providing a score that indicates a level to which a first digital image is different from or similar to a second image.

Moreover, the digital-image modification detection and indication system improves the efficiency of conventional image editing systems. As discussed above, the rigid score-based approaches of conventional systems are universally applied to digital images, regardless of image size or number of modifications. This leads to heavy computational resource expenditures in processing large digital images—even when those images have only experienced few modifications. In contrast, the digital-image modification detection and indication system applies a targeted, modification-specific approach that scales resource use to the number of modifications associated with a digital image. Accordingly, the digital-image modification detection and indication system efficiently utilizes computing resources by avoiding the tendency of conventional systems to overprocess digital images.

As illustrated by the foregoing discussion, the present disclosure utilizing a variety of terms to describe features and advantages of the digital-image modification detection and indication system. Additional detail is now provided regarding the meaning of such terms. For example, as used herein, the term "digital image" refers to a collection of digital information that represents an image. In one or more embodiments, a digital image is stored as a file (e.g., a ".jpeg" file, a ".tiff" file, a ".bmp" file, a ".pdf" file). As used herein, the term "modified version of a digital image" refers to a non-identical version of a digital image. For example, a modified version of a digital image includes the digital image with one or more modifications.

As used herein, a "change record" refers to a file, table entry, list, or other information indicator that including information associated with a modification (e.g., an edit) to a digital image. For example, a change record associated with a particular modification includes vertices of a polygon representing an area of one or more pixels within the digital image that were changed by the particular modification. Thus, in one or more embodiments, the vertices of the polygon are positioned relative to the digital image.

As used herein, a "non-contiguous modified region" refers to an area of modified pixels that does not overlap with any other area of modified pixels. In one or more embodiments, the digital-image modification detection and indication system determines a union of multiple overlapping areas of modified pixels in order to determine a single non-contiguous modified region representing all of the areas of modified pixels therein. Additionally, the digital-image modification detection and indication system identifies a single area of modified pixels associated with a single application modification operation that results in a non-contiguous modified region.

As used herein, a "modification operation" refers to any digital operation that results in a modification to one or more pixels when applied to a digital image. Some examples of modification operations include, but are not limited to, move, erase, crop, fill, blend, heal, paint, and draw.

As used herein, a "edited region indicator" refers to a solid or outlined region in an edited region overlay that corresponds to a non-contiguous modified region in a digital image. An edited region indicator, in one or more embodiments, is defined by vertices that are positioned along the outer edges of the non-contiguous modified region represented by the edited region indicator. Accordingly, an edited region indicator covers the entirety of its associated non-contiguous modified region in the corresponding digital image. For example, an edited region indicator is solid or outline, color-coded into one or more colors, translucent or opaque, patterned or solid. As used herein, an "edited region overlay" includes one or more edited region indicators positioned according to their represented non-contiguous modified regions of pixels in the digital image. As used herein, a "visual comparison" or "change comparison" refers to an edited region overlay positioned on a modified version of a digital image such that the edited region indicators in the edited region overlay indicate one or more areas of pixels in a digital image that resulted in the modified version of the digital image.

As used herein, an "object detector" refers to a machine learning model that is tuned (e.g., trained) based on inputs to approximate unknown functions. In particular, the object detector learns to approximate complex functions and generate outputs based on inputs provided to the object detector. Specifically, the digital-image modification detection and indication system trains the object detector to identify, determine, and/or tag one or more objects in a digital image or modified version of the digital image. In one or more embodiments, the object detector includes a neural network model of interconnected layers that communicate and analyze attributes at varying degrees of abstraction to learn to approximate complex functions and generate outputs based on a plurality of inputs provided to the object detector.

In one or more embodiments, the object detector includes convolutional neural networks (i.e., "CNNs"). In other words, the object detector includes an algorithm that implements deep learning techniques, i.e., machine learning that utilizes a set of algorithms to attempt to model high-level abstractions in data. For example, in at least one embodiment, the object detector includes a plurality of convolution layers and max-pooling layers followed by fully-connected layers to generate a prediction of a number, location, size, and/or type of objects within a digital image. In additional or alternative embodiments, the object detector includes other or additional neural network architectures (alone or in combination) such as: a recurrent neural network, a feed-forward neural network, a long-short term memory network, a self-organizing neural network, a decision tree, a random forest, a gradient boosting network, and/or a modular neural network.

Additional detail regarding the digital-image modification detection and indication system will now be provided with reference to the figures. For example, FIG. 1 illustrates a schematic diagram of an example system environment 100 (e.g., the "environment" 100) for implementing a digital-image modification detection and indication system 102 in accordance with one or more embodiments. Thereafter, a more detailed description of the components and processes of the digital-image modification detection and indication system 102 is provided in relation to the subsequent figures.

As shown in FIG. 1, the environment 100 includes server(s) 106, a client device 108, and a network 112. Each of the components of the environment 100 communicate via the network 112, and the network 112 may be any suitable network over which computing devices communicate. Example networks are discussed in more detail below in relation to FIG. 10.

As mentioned, the environment 100 includes the client device 108. The client device 108 includes one of a variety of computing devices, including a smartphone, tablet, smart television, desktop computer, laptop computer, virtual reality device, augmented reality device, or other computing device as described in relation to FIG. 10. Although FIG. 1 illustrates a single client device 108, in some embodiments the environment 100 includes multiple different client computing devices, each associated with a different user. The client device 108 further communicates with the server(s) 106 via the network 112.

In one or more embodiments, the client device 108 includes a digital media application 110. The digital media application 110 includes one or more features or functions that enables selection, editing, modifying, and storing of digital images. For example, in response to initialization on the client device 108, the digital media application 110 detects a selection of a particular digital image file containing a digital image. The digital media application 110 further provides the digital image in an editing mode. In response to further user interactions, the digital media application 110 enacts one or more edits or modifications on the digital image that result in a modified version of the digital image. The digital media application 110 stores the modified version of the digital image either locally on the client device 108, remotely at the server(s) 106, or both locally and remotely.

As illustrated in FIG. 1, the digital media application 110 includes the digital-image modification detection and indication system 102. In one or more embodiments, and as will be discussed in greater detail below, the digital-image modification detection and indication system 102 provides comparison tools and options in response to detecting at least one modification to a digital image. In response to a detected selection of one or more of the comparison tools and options, the digital-image modification detection and indication system 102 generates and provides a visual comparison between a digital image and a modified version of the digital image.

As illustrated in FIG. 1, the environment 100 includes the server(s) 106. The server(s) 106 may include one or more individual servers that may generate, store, receive, and transmit electronic data. For example, the server(s) 106 may receive data from the client device 108 in the form of a modified version of a digital image including metadata associated with modifications made in connection with the modified version of the digital image. In addition, the server(s) 106 transmits data to the client device 108. Furthermore, the server(s) 106 includes one or more machine learning models. In some embodiments, the server(s) 106 comprises a content server. The server(s) 106 also optionally comprises an application server, a communication server, a web-hosting server, a social networking server, or a digital content analytics server.

As shown in FIG. 1, the server(s) 106 includes the digital media system 104. In one or more embodiments, the digital media system 104 sends and receives data to and from the digital media application 110. Additionally, or alternatively, the digital media system 104 includes one or more machine learning models. In at least one embodiment, the digital media system 104 receives a digital image from the client device 108, and utilize a machine learning model such as an object detector to determine one or more objects in the digital image and provide one or more indicators of the objects to the client device 108. In other words, the digital media system 104 supports or otherwise works in concert with the digital media application 110. In some embodiments, the digital media system 104 hosts the digital media application 110. In other words, in such embodiments, the digital media application 110 is a web-based client application. In alternative embodiments, the digital media system 104 is an access point that allows downloading of the digital media application 110 to a client device 108.

Although FIG. 1 depicts the digital-image modification detection and indication system 102 located on the client device 108, in some embodiments, the digital-image modification detection and indication system 102 may be implemented by (e.g., located entirely or in part) on one or more other components of the environment 100. For example, the digital-image modification detection and indication system 102 may be implemented in whole, or in part, by the digital media system 104 on the server(s) 106.

Figure 2:
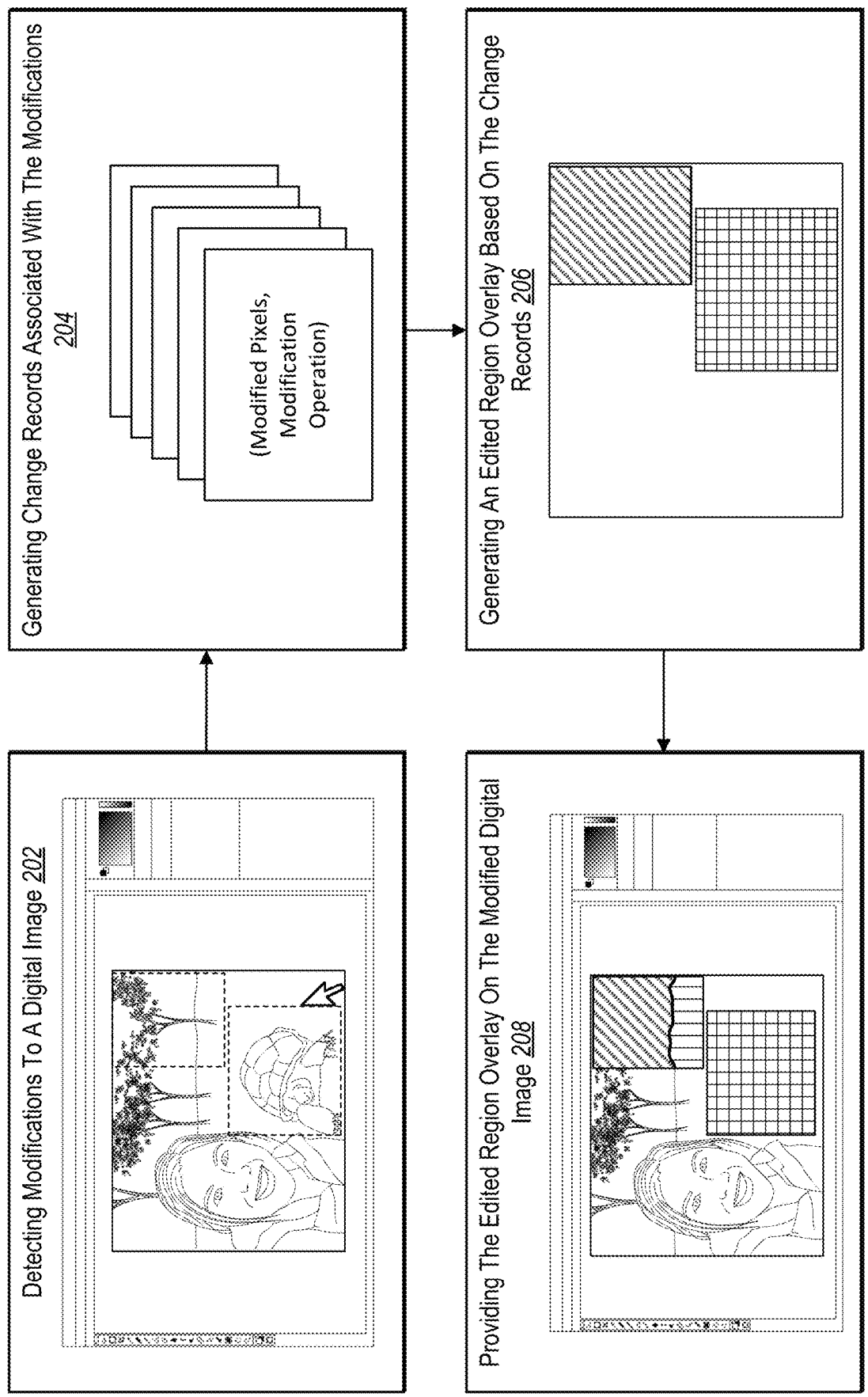
FIG. 2 illustrates an overview of the digital-image modification detection and indication system generating edited region indicators (e.g., overlays) that visually indicate modifications between two versions of a digital image in accordance with one or more embodiments.

FIG. 2 illustrates an overview of the digital-image modification detection and indication system 102 generating a visual comparison between two digital images. In particular, the digital-image modification detection and indication system 102 detects one or more modifications to a digital image, and generates a change record associated with each detected modification. The digital-image modification detection and indication system 102 generates one or more edited region indicators based on modification areas indicated by the change records. Ultimately, the digital-image modification detection and indication system 102 generates a visual comparison by positioning an edited region overlay comprising the edited region indicators over the modified version of the digital image such that the user can quickly and easily see all edited regions that resulted in the modified version of the digital image—including any potentially unintended modifications that might cause the modified version of the digital image to be unusable.

In more detail, as shown in FIG. 2, the digital-image modification detection and indication system 102 performs an act 202 of detecting modifications to a digital image. For example, the digital-image modification detection and indication system 102 detects a modification to a digital image by detecting one or more modified pixels in the digital image. The digital-image modification detection and indication system 102 further detects the modification operation that resulted in the modified pixels (e.g., in response to a notification or other information received from the digital media application 110).

As further shown in FIG. 2, the digital-image modification detection and indication system 102 performs an act 204 of generating change records associated with the modifications. For example, the digital-image modification detection and indication system 102 generates a change record associated with a detected modification that includes an area of modified pixels, and the associated modification operation. To illustrate, the digital-image modification detection and indication system 102 identifies vertices of a polygon representing the area of modified pixels in the digital image, and stores the vertices of the polygon in the associated change record, along with the associated modification operation. In one or more embodiments, the digital-image modification detection and indication system 102 stores the generated change records in a collection in the order in which the modifications occurred in with the digital image.

As further shown in FIG. 2, the digital-image modification detection and indication system 102 performs an act 206 of generating an edited region overlay based on the change records. For example, the digital-image modification detection and indication system 102 iteratively identifies overlapping and isolated polygons represented among the change records in order to generate one or more non-contiguous modified regions of modified pixels associated with the digital image. The digital-image modification detection and indication system 102 generates the edited region overlay including edited region indicators representing the non-contiguous modified regions.

Also as shown in FIG. 2, the digital-image modification detection and indication system 102 performs an act 208 of providing the edited region overlay on the modified digital image. For example, the digital-image modification detection and indication system 102 positions the edited region overlay on the modified version of the digital image such that the edited region indicators cover areas in the modified version of the digital image where various modification operations resulted in changed pixels. In at least one embodiment, the digital-image modification detection and indication system 102 selects colors, patterns, and translucency filters for the edited region indicators that are distinct from underlying colors, patterns, and shapes in the modified version of the digital image. Additionally, the digital-image modification detection and indication system 102 optionally further subdivides the edited region indicators based on object(s) detected in the modified version of the digital image over which the edited region indicators lay. The resulting visual comparison easily and intuitively illustrates all modifications made to the digital image in order to arrive at the modified version of the digital image, including one or more unintended modifications (e.g., such as those that resulted in the uneven horizon line in the background).

Figure 3A:
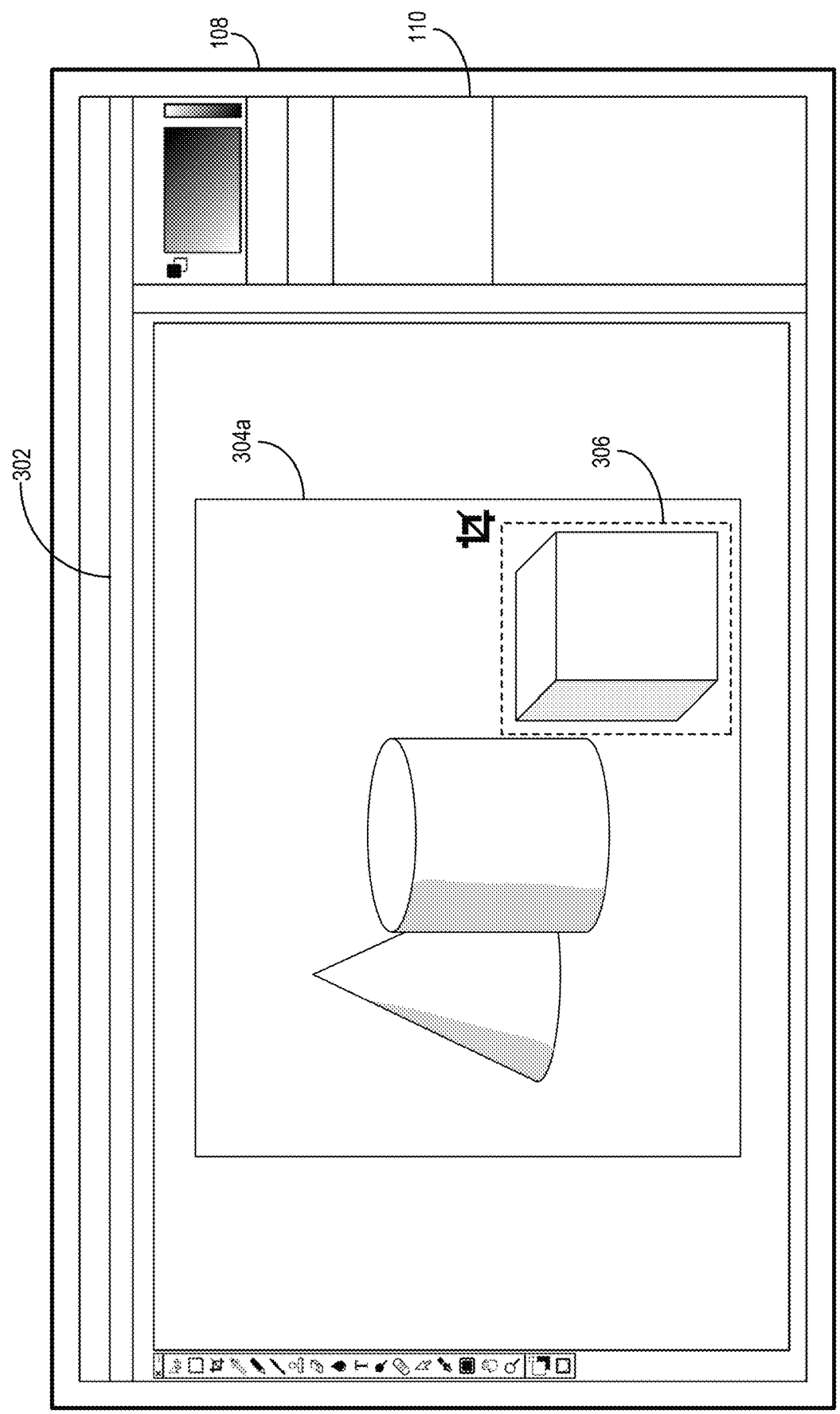
FIGS. 3A-3C illustrate the digital-image modification detection and indication system detecting modifications to a digital image and generating a change record in response to the detected modifications in accordance with one or more embodiments.
Figure 3B:
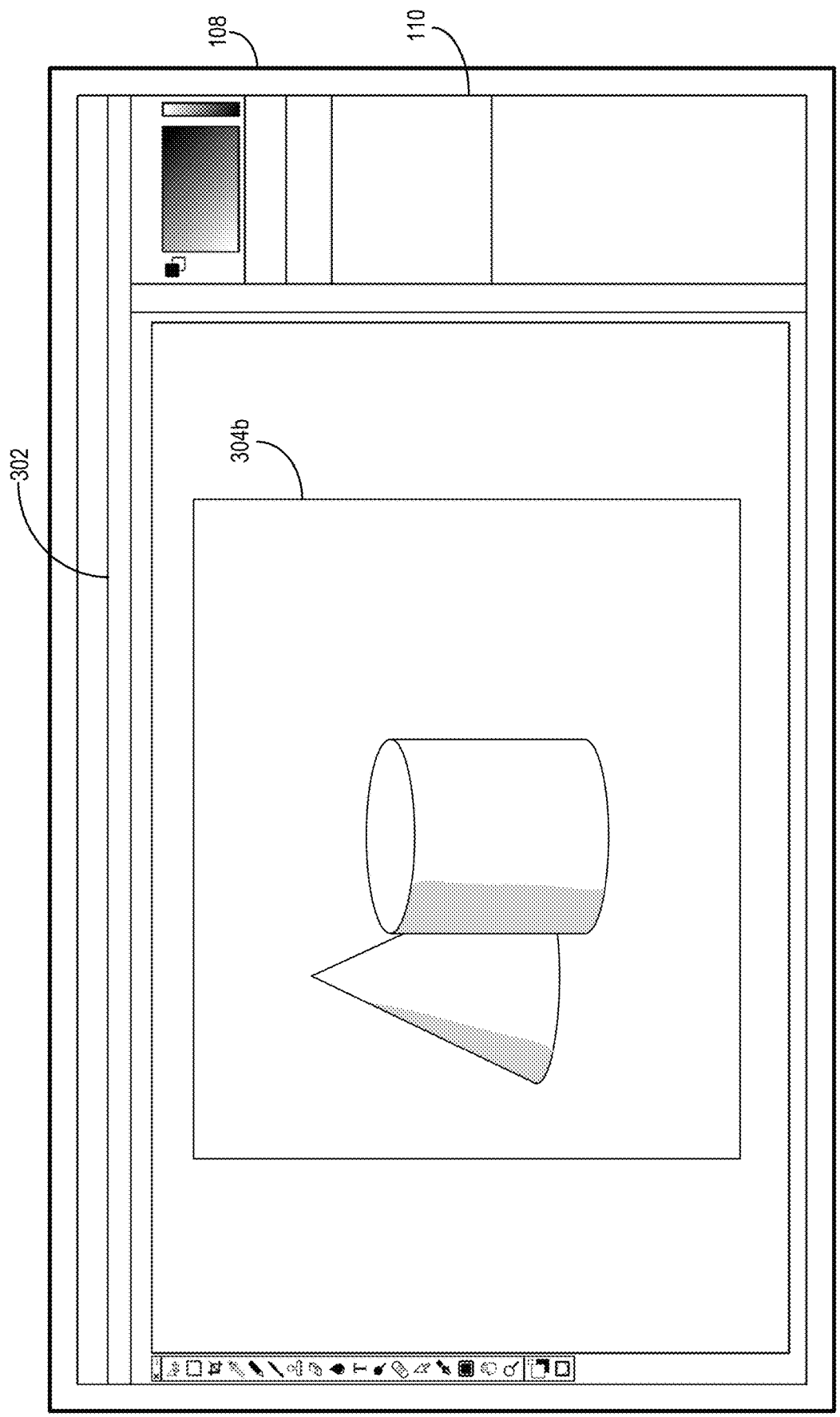
Figure 3C:
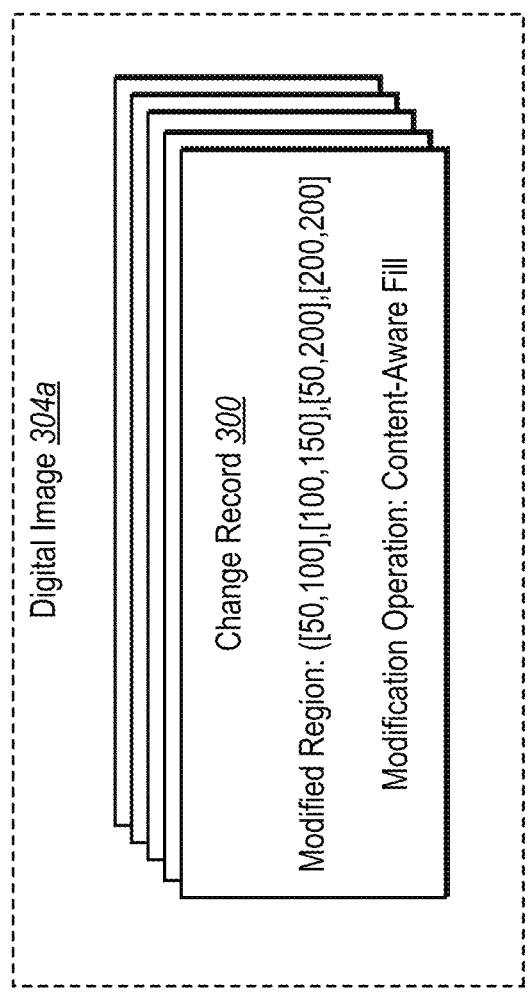

FIGS. 3A-3C illustrate the digital-image modification detection and indication system 102 generating a change record in response to detected modifications to a digital image. For example, the digital-image modification detection and indication system 102 detects one or more modifications in connection with a digital image 304*a* displayed in a graphical user interface 302 of the digital media application 110 on the client device 108. In more detail, the digital-image modification detection and indication system 102 detects any modification in connection with the digital image 304a, including a crop modification that selects an object (e.g., as in FIG. 3A), removes the selected object (e.g., a cube object) from the digital image 304a and back fills the area previously occupied by the object (e.g., by cloning surrounding areas) resulting in the modified version of the digital image 304b, as shown in FIG. 3B.

More specifically, as shown in FIG. 3A, the digital-image modification detection and indication system 102 detects a modification in connection with the digital image 304a by determining a region 306 of pixels that are modified by a particular modification operation (e.g., a crop operation). For example, the digital-image modification detection and indication system 102 determines the region 306 in various ways. To illustrate, the digital-image modification detection and indication system 102 determines the region 306 by detecting specific user interactions associated with a modification operation in connection with the digital image 304a (e.g., a down-click associated with a first pixel in the digital image 304a followed by an up-click associated with a second pixel in the digital image 304a). Additionally, or alternatively, the digital-image modification detection and indication system 102 determines the region 306 by identifying one or more boundaries denoted by one or more modified pixels immediately adjacent to non-modified pixels following completion of a modification operation and/or detected user interaction (e.g., a click and drag).

In response to determining the region 306 of modified pixels in the digital image 304a, the digital-image modification detection and indication system 102 generates a change record associated with the digital image 304a. For example, as shown in FIG. 3C and in response to determining the region 306 of modified pixels, the digital-image modification detection and indication system 102 generates a change record 300. In one or more embodiments, the digital-image modification detection and indication system 102 generates the change record 300 including an indication of the region 306 of modified pixels and the associated modification operation.

To illustrate, the digital-image modification detection and indication system 102 generates the indication of the region 306 in the change record 300 by determining one or more vertices of a polygon that represents the region 306 in the digital image 304a. For example, the digital-image modification detection and indication system 102 determines that the region 306 includes four vertices (e.g., four corners) at the points or pixels in the digital image 304a represented by the x and y coordinates: [50, 100], [100, 150], [50, 200], and [200,200]. Accordingly, the digital-image modification detection and indication system 102 includes the determined vertex coordinates in the change record 300. In additional embodiments, the digital-image modification detection and indication system 102 determines the vertices of any shape polygon that represents a region of modified pixels in a digital image. For example, the digital-image modification detection and indication system 102 determines vertices of a polygon that is convex, concave, and/or that contains one or more holes.

Additionally, the digital-image modification detection and indication system 102 further generates the change record 300 including an indication of a modification operation associated with the region 306 of modified pixels. For example, the digital-image modification detection and indication system 102 determines the modification operation associated with the region 306 by identifying a most recently selected tool within the digital media application 110, or by receiving a notification from the digital media application 110 of a most recently selected tool. In additional or alternative embodiments, the digital-image modification detection and indication system 102 determines the modification operation associated with the region 306 by utilizing one or more trained models to the pixels in the region 306 determine a modification operation that resulted in the modifications to the pixels within the region 306.

As further shown in FIG. 3C, the digital-image modification detection and indication system 102 stores the generated change record 300 in association with the digital image 304a and other change records associated with the digital image 304a. For example, in at least one embodiment, the digital-image modification detection and indication system 102 adds the generated change record 300 to a set of existing change records associated with the digital image 304a. The digital-image modification detection and indication system 102 further stores the set of change records as metadata associated with the digital image 304a. In additional or alternative embodiments, the digital-image modification detection and indication system 102 stores change records associated with the digital image 304a in a linked list, a lookup table, a separate file, or any other suitable storage architecture.

Figure 4:
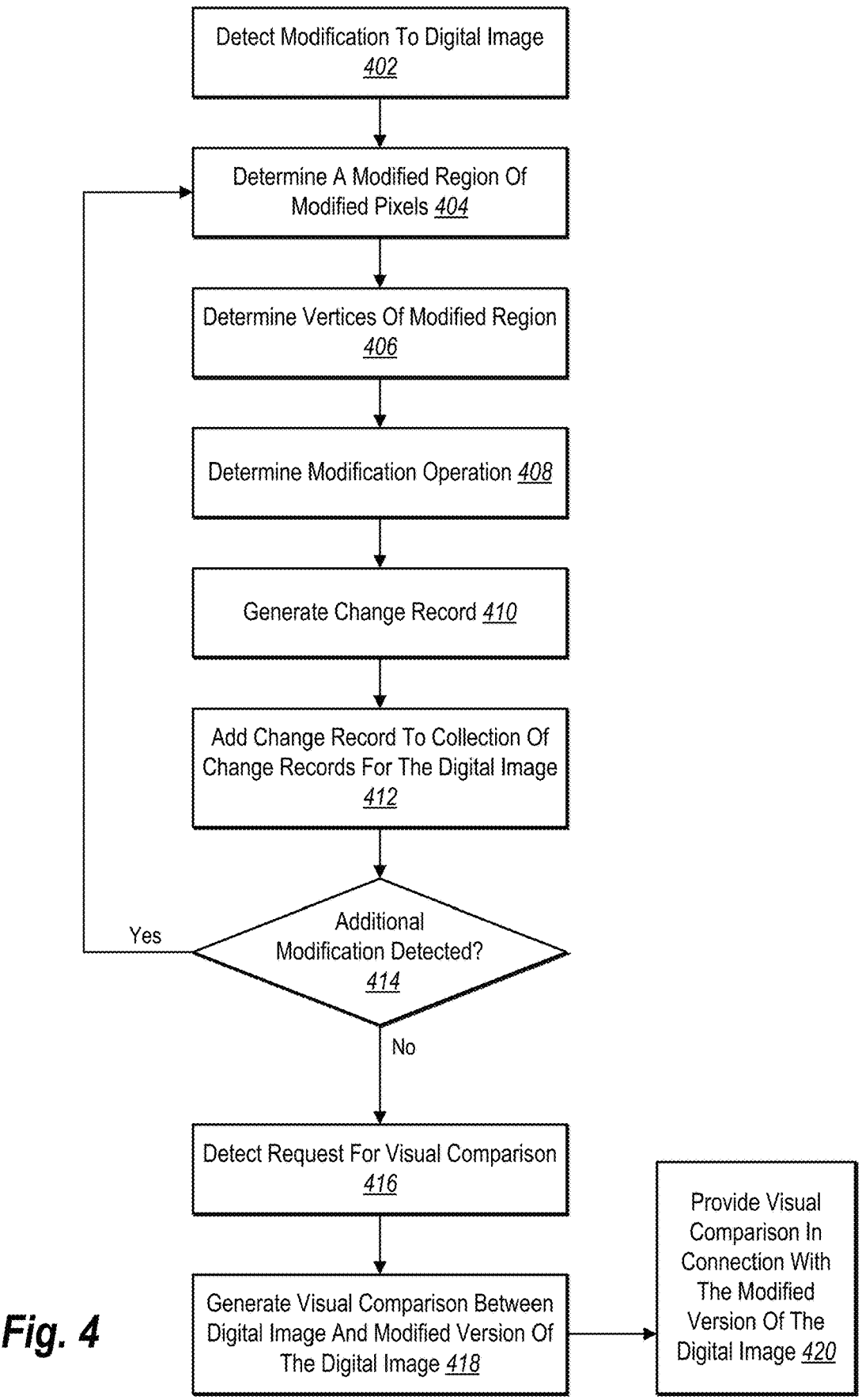
FIG. 4 illustrates a sequence diagram of the digital-image modification detection and indication system generating a set of change records associated with a digital image in accordance with one or more embodiments.

FIG. 4 illustrates a sequence diagram of the digital-image modification detection and indication system 102 generating a set of change records associated with a digital image. For example, and as will be discussed in greater detail below, the digital-image modification detection and indication system 102 generates and stores a change record in response to detecting a modification to a digital image. Accordingly, the resulting set of change records associate with the digital image is ordered based on the order in which the corresponding modifications occurred in connection with the digital image. In response to a detected request for a visual comparison, the digital-image modification detection and indication system 102 generates a visual comparison between the digital image and the modified version of the digital image based on the ordered set of change records.

In more detail, the digital-image modification detection and indication system 102 detects a modification to a digital image in an act 402. The digital-image modification detection and indication system 102 detects a modification to the digital image in response to receiving a notification, flag, and/or update from the digital media application 110 indicating that a modification tool has been selected and/or applied to the digital image. Additionally, or alternatively, the digital-image modification detection and indication system 102 detects a modification to the digital image by identifying at least one modified pixel in the digital image.

The digital-image modification detection and indication system 102 further determines a modified region of modified pixels associated with the detected modification in an act 404. For example, the digital-image modification detection and indication system 102 determines the modified region by identifying all pixels modified by the detected modification operation. To illustrate, the digital-image modification detection and indication system 102 detects all pixels modified by a single user interaction applying a modification to the digital image (e.g., pixels modified by a single mouse stroke associated with a brush tool). Alternatively, in at least one embodiment, the digital-image modification detection and indication system 102 detects all pixels modified by a series of applications of the same modification operation (e.g., pixels modified by multiple mouse strokes associated with the brush tool).

The digital-image modification detection and indication system 102 determines vertices of the modified region of pixels in an act 406. For example, the digital-image modification detection and indication system 102 determines vertices of the modified region by generating a polygon whose edges follow the edges of the modified region. To illustrate, the digital-image modification detection and indication system 102 generates the polygon by matching the edges of the polygon to the edges of the modified region. Additionally, or alternatively, if the modified region has more than a threshold number of edges (e.g., is a complex or non-standard shape), the digital-image modification detection and indication system 102 applies a regression to the modified region that simplifies the modified region to a more basic shape. The digital-image modification detection and indication system 102 can then fit the polygon to the basic shape of the modified region.

In one or more embodiments, the digital-image modification detection and indication system 102 determines the vertices of the polygon by identifying the pixel coordinates of the pixels in the digital image over which the vertices or corners of the polygon lie. For example, if the polygon has five vertices, the digital-image modification detection and indication system 102 identifies the pixel coordinates of the five pixels in the digital image over which each vertex of the polygon lays. In at least one embodiment, the pixels coordinates include an x-coordinate and a y-coordinate, where first pixel in the bottom, left-hand corner of the digital image has pixel coordinates of [0, 0].

The digital-image modification detection and indication system 102 also determines a modification operation associated with the detected modification in an act 408. For example, the digital-image modification detection and indication system 102 determines the modification operation associated with the detected modification by determining a currently active or most recently applied tool or option in connection with the digital image. For example, the digital-image modification detection and indication system 102 receives a notification from the digital media application 110, or identifies a flag or system value associated with the digital media application 110 that indicates the currently active or most recently applied tool within the digital media application 110. Additionally, or alternatively, the digital-image modification detection and indication system 102 determines the modification operation associated with the detected modification by utilizing one or more models in connection with the region of modified pixels to generate one or more modification operation predictions.

In response to determining the vertices of the modified region and the associated modification operation, the digital-image modification detection and indication system 102 generates a change record in an act 410. As discussed above, the digital-image modification detection and indication system 102 generates the change record associated with the detected modification including the vertices of the modified region and the associated modification operation. In additional or alternative embodiments, the digital-image modification detection and indication system 102 further generates the change record including a timestamp for when the modification was detected, a duration of how long it took to apply the modification to the digital image, and/or an amount of time that elapsed in between the detected modification and an immediately previous modification.

The digital-image modification detection and indication system 102 adds the generated change record to a collection of change records for the digital image in an act 412. For example, as discussed above, the digital-image modification detection and indication system 102 adds the generated change record to metadata associated with the digital image. If there are additional, previously stored change records in the metadata associated with the digital image, the digital-image modification detection and indication system 102 adds the newly generated change record to the collection of existing change records. For example, in at least one embodiment, the digital-image modification detection and indication system 102 adds the change record to the collection in a first-in-first-out manner. Additionally, or alternatively, the digital-image modification detection and indication system 102 adds the change record to the collection in a last-in-first-out manner. Regardless of how the digital-image modification detection and indication system 102 adds the change record to the collection, the resulting collection of change records is in the same order that the corresponding modifications were detected in connection with the digital image. In one or more embodiments, the space complexity of storing the collection of change records in connection with the digital image is determined according to the following:

$$\text{Space Complexity}(S) = \sum_{i=1}^{n} V_i$$

Where n is the total number of polygons represented by the vertices listed in the collection of change records, and the number of vertices in the $i^{th}$ polygon is denoted by $V_i$.

In one or more embodiments, the digital-image modification detection and indication system 102 may determine not to store a particular change record. For example, the digital-image modification detection and indication system 102 may not store a change record in response to determining that a modification operation associated with the change record is a global modification operation. To illustrate, the digital-image modification detection and indication system 102 determines that a modification operation is global by determining that the pixel area the polygon represented by the vertices in the change record has the same pixel area as the digital image, or that the vertices of the polygon follow the outermost edge of the digital image. Global modification operations includes, but are not limited to, color palette changes (e.g., changing the digital image from color to black and white), image-wide filter effects, and so forth.

Additionally, or alternatively, the digital-image modification detection and indication system 102 may not store a change record in response to detecting a user selection or input indicating that the change record should not be stored. For example, the digital-image modification detection and indication system 102 detects a user selection of an option that while selected causes the digital-image modification detection and indication system 102 to disregard any detected modifications to the digital image. In one or more embodiments, the digital-image modification detection and indication system 102 again stores change records in response to detecting that the same option has been un-selected (e.g., turned off).

Returning to FIG. 4, after storing the change record, the digital-image modification detection and indication system 102 determines whether an additional modification is detected in connection with the digital image in an act 414. For example, the digital-image modification detection and indication system 102 receives a notification or update from the digital media application 110 indicating an additional modification to the digital image. In response to detecting an additional modification in connection with the digital image (e.g., "Yes" in the act 414), the digital-image modification detection and indication system 102 repeats the acts 404-412 in connection with the additional modification to the digital image.

In one or more embodiments, the digital-image modification detection and indication system 102 continues to repeat the acts 404-412 unless and until the digital-image modification detection and indication system 102 detects one or more triggers. For example, the digital-image modification detection and indication system 102 determines that no additional modifications have been detected (e.g., "No" in the act 414) in response to determining that no additional modifications have been detected in a predetermined period of time (e.g., none detected in the last two minutes). In another example, the digital-image modification detection and indication system 102 determines that no additional modifications have been detected (e.g., "No" in the act 414) in response to determining that the digital image has been saved (e.g., in response to a user selection of a save option, or in response to an automatic save initiated by the digital media application 110). In another example, the digital-image modification detection and indication system 102 determines that no additional modifications have been detected (e.g., "No" in the act 414) in response to detecting a user selection of one or more options provided by the digital media application 110 that are not related to editing or modifying the digital image (e.g., a detected selection of a share option, a detected selection of a visual comparison option).

In response to determining that no additional modifications are detected (e.g., "No" in the act 414), the digital-image modification detection and indication system 102 detects a request for a visual comparison in an act 416. For example, the digital-image modification detection and indication system 102 detects a selection of a visual comparison tool or option in connection with the now-modified version of the digital image via the digital media application 110. In additional or alternative embodiments, the digital-image modification detection and indication system 102 detects a request for a visual comparison that is automatically generated by the digital media application 110 in response to determining that an edit or modification has not been detected in connection with the digital image for a threshold period of time (e.g., the digital media application 110 automatically requests a visual comparison in response to determining that the digital image is open but has not been edited for three minutes).

The digital-image modification detection and indication system 102 further generates the visual comparison between the digital image and the modified version of the digital image in an act 418. For example, and as will be discussed in greater detail below with regard to FIGS. 5-7, the digital-image modification detection and indication system 102 generates the visual comparison that illustrates areas or regions in the modified version of the digital image where modifications occurred. The digital-image modification detection and indication system 102 color-codes the visual comparison to make the modified areas and any objects in the modified version of the digital image that are overlapped by the modified areas easier to see.

The digital-image modification detection and indication system 102 also provides the visual comparison in connection with the modified version of the digital image in an act 420. For example, the digital-image modification detection and indication system 102 positions the generated visual comparison over the modified version of the digital image in a graphical user interface of the digital media application 110 on the client device 108. As mentioned above, the generated visual comparison includes one or more areas or regions representing areas of modified pixels of the digital image that resulted in the modified version of the digital image. Accordingly, the digital-image modification detection and indication system 102 positions the visual comparison such that the one or more areas or regions visual indicate where the modification in the digital image occurred.

In at least one embodiment, the digital-image modification detection and indication system 102 provides the visual comparison with additional interactive features. For example, the digital-image modification detection and indication system 102 generates the visual comparison to include indicators of modification operations associated with each of the regions of modified pixels. Thus, for example, after providing the generated visual comparison in connection with the modified version of the digital image, the digital-image modification detection and indication system 102 detects a user interaction with one of the regions of modified pixels (e.g., a mouse-hover user interaction), and displays the list of modification operations associated with that region.

In one or more embodiments, the digital-image modification detection and indication system 102 continues to detect modifications in association with the digital images and continue to update the collection of change records. The digital-image modification detection and indication system 102 then updates the visual comparison based on the updated collection of change records. Thus, the digital-image modification detection and indication system 102 maintains a visual comparison associated with the digital image that accurately reflects all of the modifications and/or edits that have taken place in connection with the digital image.

Figure 5:
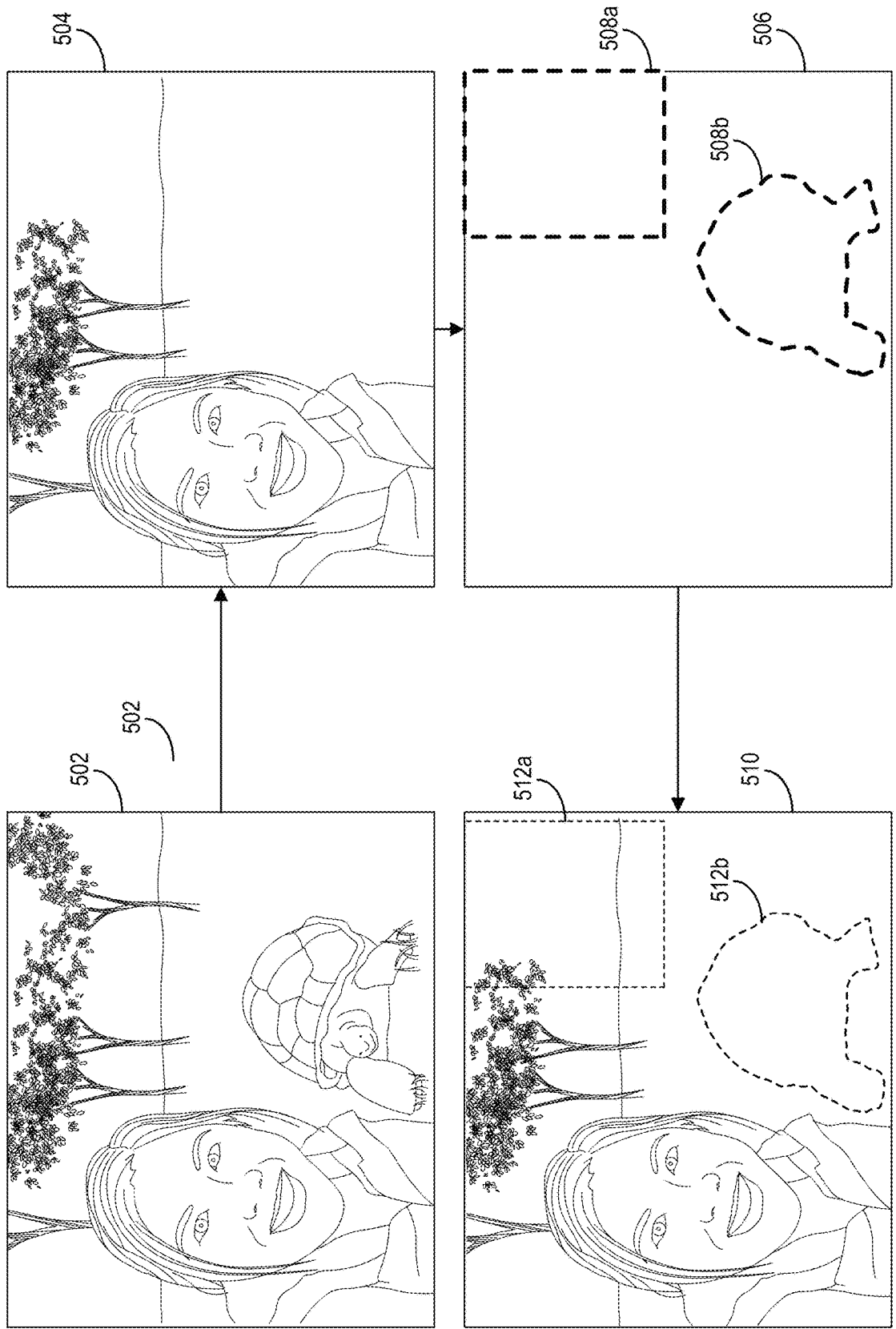
FIG. 5 illustrates an overview of the digital-image modification detection and indication system generating edited region indicators (e.g., region outlines) that visually indicate modifications between two versions of a digital image in accordance with one or more embodiments.

FIG. 5 illustrates an overview of the digital-image modification detection and indication system 102 generating a visual comparison between a digital image and a modified version of the digital image. For example, the digital-image modification detection and indication system 102 detects one or more modifications to the digital image 502. Specifically, the digital-image modification detection and indication system 102 detects one or more modifications to the digital image 502 that resulted in a modified version of the digital image 504 (e.g., cropping of one of the trees and the tortoise, and back filling make it seem like the tree and the tortoise were not there to begin with).

In response to detecting the modifications to the digital image 502 (and generating a change record for each detected modification), the digital-image modification detection and indication system 102 generates an edited region overlay 506 including edited region indicators corresponding to the non-contiguous modified regions 508a and 508b representing areas of modified pixels in the digital image 502. For example, the digital-image modification detection and indication system 102 determines the non-contiguous modified region 508a corresponding to a single application of a crop tool (e.g., a click and drag selection of an area of the digital image 502). Additionally, the digital-image modification detection and indication system 102 determines the non-contiguous modified region 508b by identifying and consolidating multiple overlapping areas of modified pixels (e.g., areas resulting from multiple applications of a selection tool that follows the outline of the tortoise for cropping).

The digital-image modification detection and indication system 102 further generates a visual comparison 510 between the digital image 502 and the modified version of the digital image 504. For example, as shown in FIG. 5, the digital-image modification detection and indication system 102 generates the visual comparison 510 by positioning the edited region overlay 506 on the modified version of the digital image 504. In one or more embodiments, the digital-image modification detection and indication system 102 positions the edited region overlay 506 over the modified version of the digital image 504 so that the edited region indicators 512a, 512b for the non-contiguous modified regions 508a, 508b are in the same area as the associated modifications that they represent. In additional or alternative embodiments, the digital-image modification detection and indication system 102 color-codes all or portions of the edited region indicators 512a, 512b (e.g., based on object detection in connection with the modified version of the digital image 504), and/or adds interactive functionality such as providing a displayed list of modification operations associated with the edited region indicators 512a, 512b. As shown in FIG. 5, the digital-image modification detection and indication system 102 generates the visual comparison 510 in an outline mode such that the edited region indicators 512a, 512b are provided as outlines. In another embodiment, as will be shown below with regard to FIG. 7, the digital-image modification detection and indication system 102 also provides a visual comparison in overlay mode where the edited region indicators are provided as masks including one or more colors, patterns, and/or translucency filters.

Figure 6A:
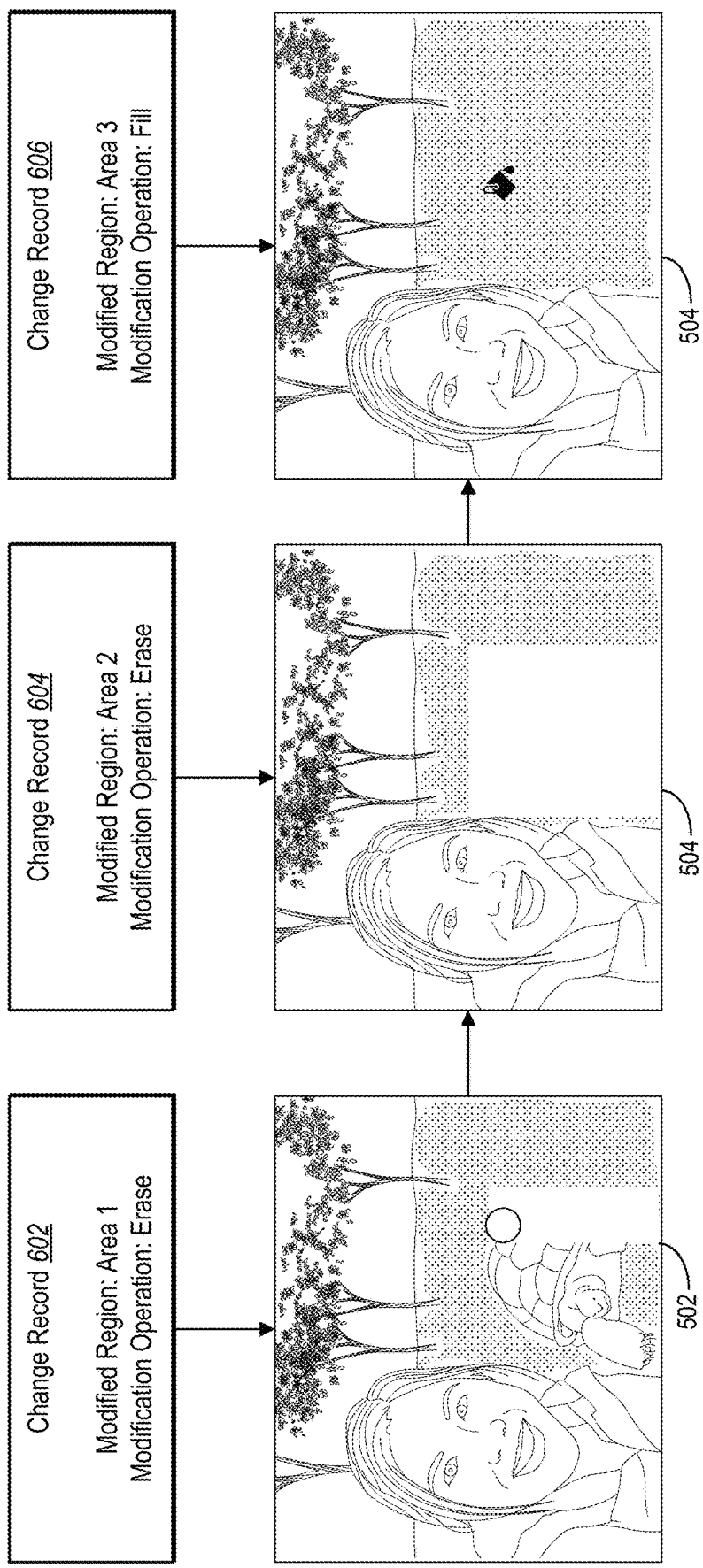
FIG. 6A illustrates an overview of the digital-image modification detection and indication system detecting and generating change records associated with overlapping modifications in accordance with one or more embodiments.

FIG. 6A illustrates an overview of the digital-image modification detection and indication system 102 detecting and generating change records associated with overlapping modifications. For example, the digital-image modification detection and indication system 102 detects a modification to the digital image 502 that changes the color of pixels in a modification region to white (e.g., an erase tool applied to a portion of the tortoise in the digital image 502). In response to this detected modification, the digital-image modification detection and indication system 102 generates the change record 602 that includes a modification of the modified region (e.g., "Area 1"), and the detected modification operation (e.g., "Erase").

The digital-image modification detection and indication system 102 continues to detect an additional modification to the now-modified version of the digital image 504 that modifies a second region of pixels in order to completely erase the tortoise. In response to detecting the additional modification, the digital-image modification detection and indication system 102 generates the change record 604 including the modified region (e.g., "Area 2"), and the modification operation (e.g., "Erase"). In one or more embodiments, the modified region in the change record 604 overlaps with the modified region in the change record 602. For example, the user partially overlapped the previously erased area when applying the erase tool, a second time.

Additionally, the digital-image modification detection and indication system 102 detects another modification to the modified version of the digital image 504 that fills in the erased area with a color or pattern that matches the existing background. In response to detecting the additional modification, the digital-image modification detection and indication system 102 generates the change record 606 including the modified region (e.g., "Area 3"), and the modification operation (e.g., "Fill"). In one or more embodiments, the modified region in the change record 606 overlaps with the modified regions in both the change record 604 and the change record 602 because the fill operation changes the white pixels that resulted from both of the previous erase modifications to the same color or pattern.

Figure 6B:
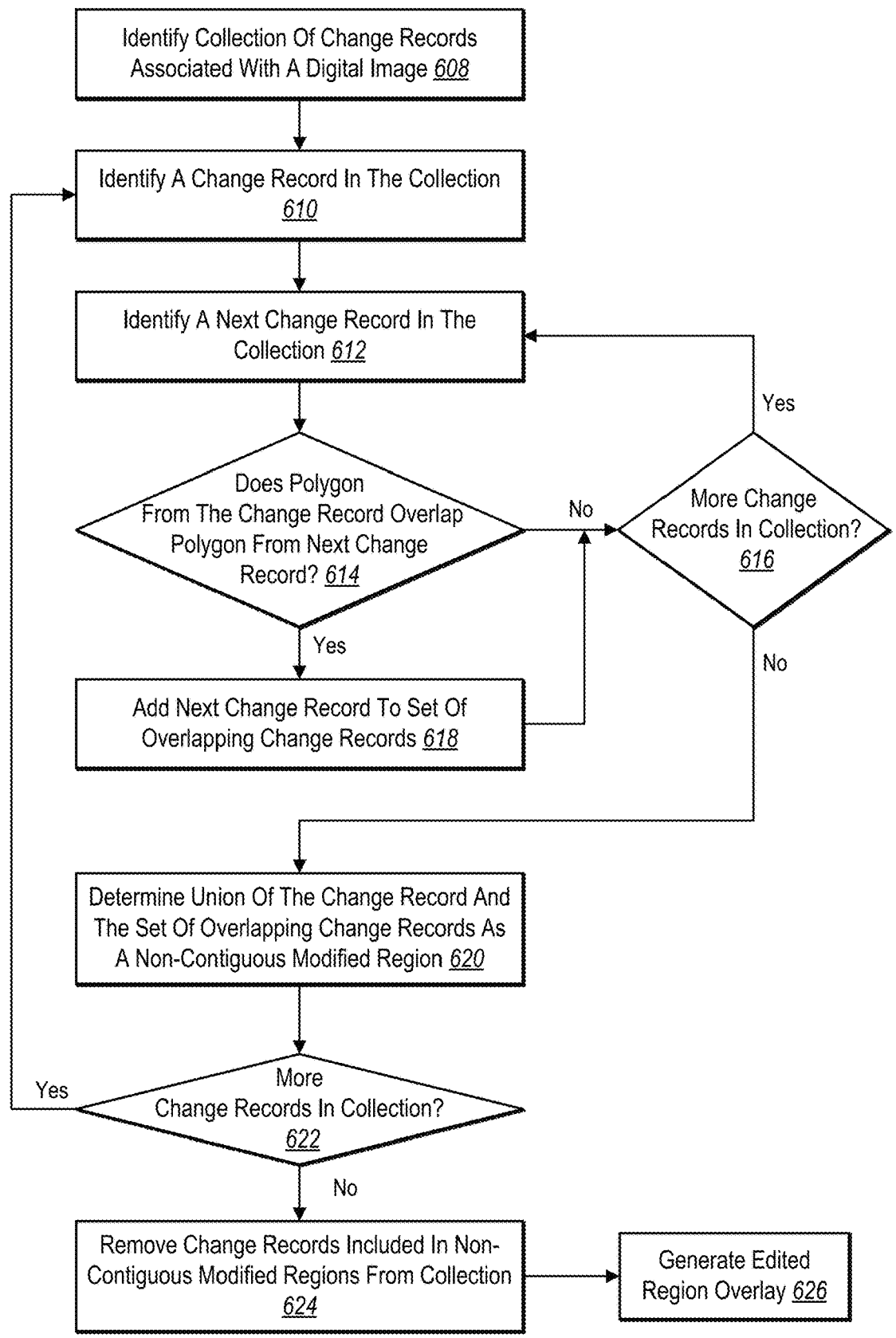
FIG. 6B illustrates a detailed sequence diagram of the digital-image modification detection and indication system determining one or more non-contiguous modified regions of modified pixels in a digital image based on change records associated with the digital image in accordance with one or more embodiments.

FIG. 6B illustrates a detailed sequence diagram of the digital-image modification detection and indication system 102 determining one or more non-contiguous modified regions of modified pixels in a digital image based on change records associated with the digital image. For example, and as will be discussed in greater detail below, the digital-image modification detection and indication system 102 analyzes change records to iteratively identify overlapping polygons representing regions of modified pixels in the corresponding digital image. After identifying all non-contiguous modified regions of pixels—including overlapping areas of modified pixels and isolated areas of modified pixels—the digital-image modification detection and indication system 102 generates an edited region overlay including the non-contiguous modified regions along with the modification operations that are associated with each non-contiguous modified region.

In more detail, the digital-image modification detection and indication system 102 identifies a collection of change records associated with a digital image in an act 608. For example, the digital-image modification detection and indication system 102 identifies the collection of change records in response to detecting a selection of a comparison tool in connection with a modified version of the digital image (e.g., the modified version of the digital image 504 shown in FIG. 6A). Additionally, or alternatively, the digital-image modification detection and indication system 102 identifies the collection of change records in response to determining that the digital image has not received an edit or modification for a threshold amount of time (e.g., two minutes).

In one or more embodiments, the digital-image modification detection and indication system 102 identifies the collection of change records by analyzing metadata associated with the digital image. For example, the digital-image modification detection and indication system 102 analyzes the metadata to identify one or more change records in an ordered collection. In additional or alternative embodiments, the digital-image modification detection and indication system 102 identifies the collection of change records by analyzing other data associated with the digital image (e.g., a separate database or lookup table).

The digital-image modification detection and indication system 102 also identifies a change record from the collection in an act 610. In one or more embodiments, as mentioned above, the change records in the collection are in an order that corresponds to an order in which the corresponding modifications were detected. Accordingly, in a first iteration, the digital-image modification detection and indication system 102 identifies a change record in the collection that corresponds to either an oldest or a most recent modification to the digital image (e.g., depending on whether the collection is first-in-first-out or last-in-first-out). In subsequent iterations of the sequence of acts illustrated in FIG. 6B, the digital-image modification detection and indication system 102 identifies change records in the same order as are in the collection until all change records are processed.

The digital-image modification detection and indication system 102 further identifies a next change record in the collection in an act 612. In one or more embodiments, the digital-image modification detection and indication system 102 compares every change record in the collection against every other change record in the collection to determine whether representative polygons overlap. Accordingly, in a first iteration where the digital-image modification detection and indication system 102 identified a first change record in the collection in the act 610, the digital-image modification detection and indication system 102 identifies the next change record by identifying the second change record in the collection. In subsequent iterations, the digital-image modification detection and indication system 102 identifies the next change record by identifying subsequent change records in order within the collection.

After identifying the change record and the next change record in the collection, the digital-image modification detection and indication system 102 determines whether a polygon from the change record overlaps a polygon from the next change record in an act 614. In one or more embodiments, the digital-image modification detection and indication system 102 determines whether the polygon from the change record overlaps the polygon from the next change record based on the vertices stored in each change record that represent the corresponding polygons. To illustrate, the digital-image modification detection and indication system 102 identifies the following vertices for the polygon associated with the change record: [0,0], [0,10], [10, 10], [10,0]. The digital-image modification detection and indication system 102 further identifies the following vertices for the polygon associated with the next change record: [5,5], [5,15], [15,15], [15,5]. Based on an analysis of these vertices, the digital-image modification detection and indication system 102 determines that there is a region of overlap between the two polygon, where the region of overlap is indicated by the vertices: [5,15], [5,10], [10,10], [10,5]. In additional or alternative embodiments, the digital-image modification detection and indication system 102 determines that there is an intersection between the polygons utilizing one or more machine learning models and/or geometric algorithms.

In response to determining that there is an intersection between polygons associated with the change record and the next change record (e.g., "Yes" in the act 614), the digital-image modification detection and indication system 102 adds the next change record to a set of overlapping change records (e.g., a combined change record) in an act 618. For example, the digital-image modification detection and indication system 102 adds the next change record to a set of change records that overlap with the change record identified in the act 610. The digital-image modification detection and indication system 102 next determines if there are more change records in the collection in an act 616. In response to determining that there is no intersection between polygons associated with the change record and the next change record (e.g., "No" in the act 614), the digital-image modification detection and indication system 102 also determines if there are more change records in the collection in the act 616.

In one or more embodiments, the digital-image modification detection and indication system 102 determines whether there are more change records by identifying a change record in the collection of change records that is immediately subsequent to the next change record. To illustrate, if the digital-image modification detection and indication system 102 identifies the first change record in the collection in the act 610 and the second change record in the collection in the act 612, the digital-image modification detection and indication system 102 determines that there are more change records in the collection (e.g., "Yes" in the act 616) in response to determining that the number of change records in the collection is greater than two. Additionally, or alternatively, the digital-image modification detection and indication system 102 determines that there are more change records in the collection by determining that there is at least one change record in the collection that has not already been compared against the change record identified in the act 610 for overlap.

In response to determining that there are additional change records in the collection (e.g., "Yes" in the act 616), the digital-image modification detection and indication system 102 identifies another next change record by repeating the act 612. To illustrate, if, in a first iteration, the digital-image modification detection and indication system 102 identifies the first change record in the collection in the act 610 and the second change record in the collection in the act 612, the digital-image modification detection and indication system 102 repeats the act 612, in a second iteration, by identifying a third change record as the next change record. In one or more embodiments, the digital-image modification detection and indication system 102 processes the change records in the collection in order. Thus, the digital-image modification detection and indication system 102 processes the change records in the same or reverse order in which the corresponding modifications occurred in connection with the digital image. In one or more embodiments, the digital-image modification detection and indication system 102 repeats the acts 612-616 until the change record (e.g., the first change record in the collection in the first iteration) has been compared to every other change record in the collection for overlap.

In response to determining that the change record has been compared to every other change record in the collection (e.g., "No" in the act 616), the digital-image modification detection and indication system 102 determines a union of the change record and the set of overlapping change records as a non-contiguous modified region in an act 620. For example, the digital-image modification detection and indication system 102 determines the union of the change record and the set of overlapping change records by analyzing the vertices in the change record and the set of overlapping change records to determine vertices outlining of a shape formed by overlapping all polygons associated with the change record and the set of overlapping change records. In at least one embodiment, the digital-image modification detection and indication system 102 determines the vertices of the resulting shape to be a non-contiguous modified region of pixels in the associated digital image.

In one or more embodiments, the digital-image modification detection and indication system 102 also compiles a list of modification operations associated with the union of the change record and the set of overlapping change records. For example, the digital-image modification detection and indication system 102 first adds the modification operation associated with the change record to the list of change records. Then, the digital-image modification detection and indication system 102 adds the modification operation to the list for every other change record in the set of overlapping change records. In at least one embodiment, the digital-image modification detection and indication system 102 may delete duplicate modification operations from the list. The digital-image modification detection and indication system 102 stores the list of modification operations in connection with the non-contiguous modified region that results from the union of the change record and the set of overlapping change records in the act 620.

The digital-image modification detection and indication system 102 further determines whether there are additional changes records in the collection in an act 622. In one or more embodiments, the digital-image modification detection and indication system 102 determines all non-contiguous modified regions of pixels in the digital image by comparing every change record in the collection against every other change record in the collection for overlap. Accordingly, the digital-image modification detection and indication system 102 iterates the acts 610-620 in connection with every change record in the collection (e.g., even if a change record is part of a previously determined non-contiguous region). Thus, the digital-image modification detection and indication system 102 determines that there are more change records in the collection (e.g., "Yes" in the act 622) in response to identifying a change record that has not been processed in connection with the acts 610-620.

The digital-image modification detection and indication system 102 again identifies a change record in the collection in the act 610 by identifying a change record in the collection that is immediately subsequent to the change record that was identified in the last iteration of the act 610. In one or more embodiments, the digital-image modification detection and indication system 102 processes the newly identified change record according to the acts 612-620, as discussed above.

In response to determining that every change record in the collection has been processed against every other change record in the collection (e.g., "No" in the act 622"), the digital-image modification detection and indication system 102 removes change records included in the determined non-contiguous modified regions from the collection in an act 624. In one or more embodiments, the digital-image modification detection and indication system 102 has, at this point in processing, determined all non-contiguous modified regions of pixels in the digital image. Thus, by removing any change records from the collection that are associated with the determined non-contiguous modified regions, the digital-image modification detection and indication system 102 leaves change records in the collection that represent isolated regions of modified pixels. For example, one such isolated region may be associated with an area in the digital image where a single modification was applied that did not overlap any other areas of modified pixels.

The digital-image modification detection and indication system 102 generates an edited region overlay in an act 626. In one or more embodiments, the digital-image modification detection and indication system 102 generates the edited region overlay including edited region indicators corresponding to the determined non-contiguous modified regions and any remaining isolated regions of modified pixels represented with the collection of change records. For example, the digital-image modification detection and indication system 102 generates the edited region overlay by generating edited region indicators at the vertices of the determined non-contiguous modified region. The digital-image modification detection and indication system 102 further adds edited region indicators at the vertices of any remaining isolated regions of modified pixels represented among the change records. Thus, in one or more embodiments, the resulting edited region overlay is the same dimension as the digital image and includes one or more edited region indicators represented non-contiguous modified regions—whether those regions represent multiple overlapping regions of modification or isolated regions of modification.

In at least one embodiment, the digital-image modification detection and indication system 102 further generates the edited region overlay by disregarding non-contiguous modified regions represented by polygons that have a pixel area that is equal to a total pixel area of the digital image. For example, if a non-contiguous modified region has the same pixel area as the total pixel area of the digital image, the digital-image modification detection and indication system 102 determines that the one or more modification operations represented by the non-contiguous modified region are global modification operations. Thus, in order generate a meaningful and granular visual comparison, the digital-image modification detection and indication system 102 may avoid representing global modification operations within the edited region overlay.

FIG. 7 illustrates the digital-image modification detection and indication system 102 generating a visual comparison between a digital image and a modified version of the digital image. For example, as shown in FIG. 7, the digital image 702 includes people in a speedboat in the foreground. The digital image 702 further includes a sun-spot in the foreground near the front of the speedboat, as well as a second boat and a buoy in the background. In at least one embodiment, the digital-image modification detection and indication system 102 detects a series of modifications to the digital image 702 that corrects the sunspot, removes the second boat and buoy, and backfills any empty spaces to make it appear as though the additional objects were never part of the digital image 702.

The detected modifications result in a modified version of the digital image 704. As shown, however, the modified version of the digital image 704 includes several potentially unintended modifications. For example, modifications that corrected the sun-spot also mangled the front of the speedboat. Similarly, modifications that removed the boat and the buoy from the background further caused the waterline to dip unnaturally.

Accordingly, as further shown in FIG. 7 and in order to help a user quickly and easily identify these unintended modifications, the digital-image modification detection and indication system 102 generates a visual comparison 706 by positioning an edited region overlay 708 on the modified version of the digital image 704. For example, as discussed above, the digital-image modification detection and indication system 102 generates the edited region overlay 708 including edited region indicators 710*a*, 710*b*, and 710*c* associated with corresponding non-contiguous modified regions (e.g., determined based on the sequence of acts discussed above in connection with FIG. 6B). In one or more embodiments, the digital-image modification detection and indication system 102 further generates the edited region overlay 708 by adding or applying further indicators (e.g., a translucency filter, a color, a pattern) to the edited region indicators 710*a*-710*c* to further distinguish the edited region indicators 710*a*-710*c* from the objects and colors in the modified version of the digital image 704.

To illustrate, the digital-image modification detection and indication system 102 adds a translucency filter to one or more of the edited region indicators 710*a*-710*c*. For example, the digital-image modification detection and indication system 102 applies any level or amount of translucency to any of the edited region indicators 710*a*-710*c* depending on characteristics of the modified version of the digital image 704. For example, the digital-image modification detection and indication system 102 applies a higher level of translucency to an edited region indicator that is positioned over a lighter or brighter overlap area of the modified version of the digital image 704. Conversely, the digital-image modification detection and indication system 102 applies a lower level of translucency to an edited region indicator that is positioned over a darker or shadier overlap area of the modified version of the digital image 704. Additionally, or alternatively, the digital-image modification detection and indication system 102 applies the same predetermined level of translucency to all edited region indicators 710a-710c, regardless of any characteristics of the modified version of the digital image 704.

Additionally, the digital-image modification detection and indication system 102 applies one or more colors to the edited region indicators 710a-710c. For example, the digital-image modification detection and indication system 102 applies a different color to each of the edited region indicators 710a-710c based on analysis of the overlap areas of the modified version of the digital image 704 over which each mask is positioned. To illustrate, the digital-image modification detection and indication system 102 identifies a color distribution in an overlap area of the modified version of the digital image 704 over which a mask is positioned. Based on the color distribution, the digital-image modification detection and indication system 102 identifies an $L^2$ norm over the distribution to identify a single color. Additionally, or alternatively, the digital-image modification detection and indication system 102 identifies a dominant or average color associated with the overlap area. The digital-image modification detection and indication system 102 then identifies an edited region indicator color that has a value that is distinct from the color value associated with the area of the modified version of the digital image 704. Additionally, or alternatively, the digital-image modification detection and indication system 102 applies a single predetermined color to all of the edited region indicators 710a-710c.

In additional or alternative embodiments, the digital-image modification detection and indication system 102 similarly applies one or more patterns to the edited region indicators 710a-710c. For example, the digital-image modification detection and indication system 102 applies a pattern to an edited region indicator that is distinct from a predominate pattern present in an overlap area of the modified version of the digital image 704. Additionally, or alternatively, the digital-image modification detection and indication system 102 applies the same predetermined pattern to all the edited region indicators 710a-710c.

In one or more embodiments, the digital-image modification detection and indication system 102 further subdivides the edited region indicators 710a-710c based on objects in the modified version of the digital image 704. For example, the digital-image modification detection and indication system 102 utilizes an object detector to identify one or more objects in the modified version of the digital image 704. The digital-image modification detection and indication system 102 further subdivides one or more of the edited region indicators 710a-710c based on overlap areas associated with the objects over which the edited region indicators lay. To illustrate, as shown in FIG. 7, the digital-image modification detection and indication system 102 subdivides the edited region indicator 710c along a line or lines that follow the outline of the object (e.g., the nose of the speed boat) in the modified version of the digital image 704 over which the edited region indicator 710c lays. The digital-image modification detection and indication system 102 then applies different patterns, colors, and/or translucency filters to the subdivided areas of the edited region indicator 710c—thus making the mangled front of the speedboat easier to identify.

In some embodiments, an edited region indicator may cover an overlap area of the modified version of the digital image 704 that includes no detectable objects or that includes regions that are not part of a detectable object. For example, as shown in FIG. 7, the edited region indicators 710a, 710b cover overlap areas of the modified version of the digital image 704 that include water and hillside. In some embodiments, the digital-image modification detection and indication system 102 utilizes the object detector to only identify the water. In order to make potentially unintended modification easier to identify, the digital-image modification detection and indication system 102 subdivides an edited region indicator based on grouping similar pixels in the overlap areas over which the edited region indicators 710a, 710b are positioned.

For instance, the digital-image modification detection and indication system 102 identifies one or more regions of an overlap area of the modified version of the digital image 704 over which an edited region indicator is positioned that are not part of an identified object. Put another way, the digital-image modification detection and indication system 102 identifies one or more portions or areas of an edited region indicator that does not overlay any of the objects identified in the modified version of the digital image. The digital-image modification detection and indication system 102 then segments the edited region indicator based on these identified "leftover" regions. For example, the digital-image modification detection and indication system 102 segments the corresponding areas of the edited region indicator using a geometric function such as graph cut that identifies and groups similarly colored pixels in the modified version of the digital image 704. In at least one embodiment, the digital-image modification detection and indication system 102 adjusts thresholds of the geometric function based on the size of the group of similarly colored pixels, such that smaller areas have lower thresholds and larger areas have higher thresholds. Utilizing this approach, the digital-image modification detection and indication system 102, for example, further subdivides the edited region indicators 710a,710b event though there are regions of the underlying modified version of the digital image 704 over which the edited region indicators 710a, 710b are positioned that include areas without detectable objects. The digital-image modification detection and indication system 102 applies distinct colors, translucency filters, and/or patterns to the subdivided areas of the edited region indicators 710a, 710b.

In one or more embodiments, the digital-image modification detection and indication system 102 generates the visual comparison 706 including interactive features. For example, the digital-image modification detection and indication system 102 generates the visual comparison such that, in response to a detected user interaction (e.g., a mouse hover) with any of edited region indicators 710a-710c, the digital-image modification detection and indication system 102 provides a list 712a-712c of modification operations that resulted in the modified pixels in the modified version of the digital image 704 represented by the corresponding edited region indicator. In at least one embodiment, as discussed above with regard to FIG. 6B, the digital-image modification detection and indication system 102 generates the visual comparison 706 including the interactively provided lists 712a-712c by associating the one or more modification operations that correspond with the non-contiguous modified regions as the non-contiguous modified regions are determined.

Figure 7B:
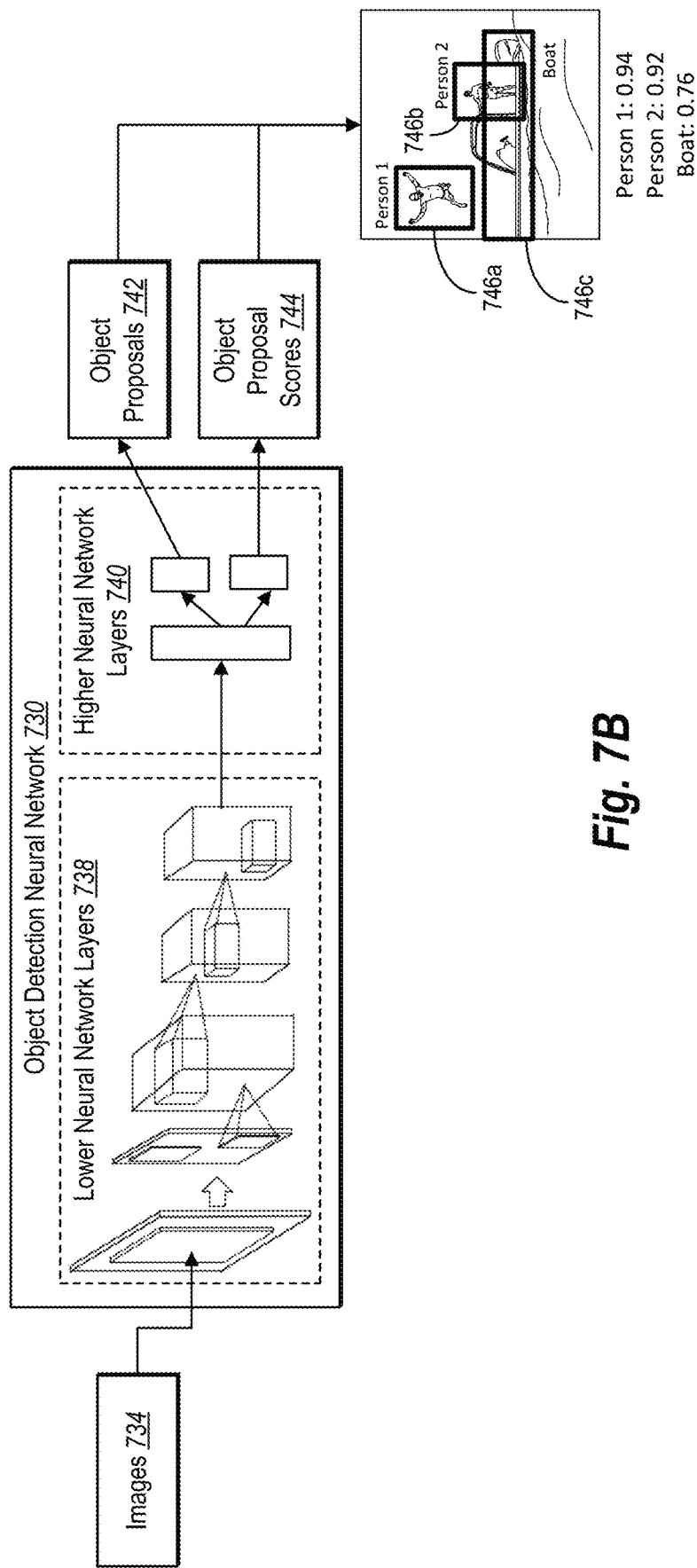
FIG. 7B illustrates an example object detection neural network in accordance with one or more embodiments of the present disclosure.

As mentioned previously, in one or more embodiments, the digital-image modification detection and indication system 102 utilizes an object detection model to detect and identify objects within images of a sequence of images. FIG. 7B illustrates one implementation of an object detection neural network that the digital-image modification detection and indication system 102 utilizes in accordance with at least one embodiment. In particular, FIG. 7B illustrates an object detection neural network 730 utilized by the digital-image modification detection and indication system 102 to detect objects. In one or more embodiments, the object detection neural network 730 comprises a deep learning convolutional neural network (CNN). For example, in some embodiments, the object detection neural network 730 comprises a region-based (R-CNN). While FIG. 7B illustrates one implementation of an object detection neural network 730, the digital-image modification detection and indication system 102 utilizes alternative implementations in other embodiments. For instance, another example of an object detection neural network is found in S. Ren, K. He, R. Girshick, and J. Sun, *Faster R-CNN. Towards real-time object detection with region proposal networks*, NIPS, 2015, the entire contents of which is hereby incorporated by reference.

As shown in FIG. 7B, the object detection neural network 730 includes lower neural network layers 738 and higher neural network layers 740. In general, the lower neural network layers 738 collectively form an encoder and the higher neural network layers 740 collectively form a decoder (or potential object detector). In one or more embodiments, the lower neural network layers 738 are convolutional layers that encode images 734 into feature vectors, which are outputted from the lower neural network layers 738 and inputted to the higher neural network layers 740. In various implementations, the higher neural network layers 740 can comprise fully-connected layers that analyze the feature vectors and output the object proposals 742 (e.g., bounding boxes around potential objects) and the object proposal scores 744.

In particular, the lower neural network layers 738 can comprise convolutional layers that generate a feature vector in the form of a feature map. To generate the object proposals 742, the object detection neural network 730 processes the feature map utilizing a convolutional layer in the form of a small network that is slid across small windows of the feature map. The object detection neural network 730 then maps each sliding window to a lower-dimensional feature. The object detection neural network 730 then processes this feature using two separate heads that are fully connected layers. In particular, the first head can comprise a box-regression layer that generates the object proposals 742 and a box-classification layer that generates the object proposal scores 744. As noted above, for reach object proposal, the object detection neural network 730 can generate a corresponding object proposal score.

As mentioned, the object detection neural network 730 generates the object proposals 742. In some embodiments, and as illustrated in FIG. 7B, the object proposals 742 comprise bounding boxes 746a-746c. For example, the each of the bounding boxes 746a-746c comprises an area that encompasses an object. In some embodiments, the digital-image modification detection and indication system 102 annotates the bounding boxes 746a-746c with labels such as the name of the detected object, the coordinates of the bounding box, and/or the dimension of the bounding box.

The object detection neural network 730 also generates the object proposal scores 744. In some embodiments, and as illustrated in FIG. 7B, the object proposal scores 744 comprise confidence scores. In particular, the confidence score corresponds to a bounding box and label. The confidence score reflects a degree of confidence with which the object detection neural network 730 predicts the label for a particular bounding box. For example, the digital-image modification detection and indication system 102 identifies a confidence score of 0.94 associated with the label "Person 1" and the bounding box 746a. The confidence score 0.94 indicates that the object detection neural network 730 predicts with 0.94 confidence that the object within the bounding box 746a comprises a person.

As illustrated in FIG. 7B, the object detection neural network 730 receives several object proposals for the image. In some instances, the digital-image modification detection and indication system 102 identifies all objects within the bounding boxes 746a-746c. For example, the bounding boxes 746a-746c comprise the approximate boundary area indicating the detected object). An approximate boundary refers to an indication of an area including an object that is larger and/or less accurate than an object mask.

The digital-image modification detection and indication system 102 identifies objects from object proposals using various methods. In some embodiments, the digital-image modification detection and indication system 102 automatically identifies objects based on object labels and confidence scores. For example, if the confidence score for a given object proposal is above a threshold (e.g., 0.90), the digital-image modification detection and indication system 102 associates the object label with approximate boundary area.

Upon identifying the objects in the images of an image, the digital-image modification detection and indication system 102 generates object masks for instances of the identified objects. Generally, instead of utilizing coarse bounding boxes during object localization, digital-image modification detection and indication system 102 generates segmentations masks that better define the boundaries of the object. The digital-image modification detection and indication system 102 utilizes the object mask neural network to generate the object masks. For example, the object mask neural network corresponds to one or more deep neural networks or models that select an object based on bounding box parameters corresponding to the object within an image. In some embodiments, the object mask neural network utilizes the techniques and approaches found in Ning Xu et al., "Deep GrabCut for Object Selection," published Jul. 14, 2017, the entirety of which is incorporated herein by reference. For example, the object mask neural network can utilize a deep grab cut approach rather than saliency mask transfer. As another example, the object mask neural network can utilize the techniques and approaches found in U.S. Patent Application Publication No. 2019/0130229, "Deep Salient Content Neural Networks for Efficient Digital Object Segmentation," filed on Oct. 31, 2017; U.S. patent application Ser. No. 16/035,410, "Automatic Trimap Generation and Image Segmentation," filed on Jul. 13, 2018; and U.S. Pat. No. 10,192,129, "Utilizing Interactive Deep Learning To Select Objects In Digital Visual Media," filed Nov. 18, 2015, each of which are incorporated herein by reference in their entirety.

In some embodiments, the digital-image modification detection and indication system 102 selects the object mask neural network based on the class of the object identified by the object detection neural network. Generally, based on identifying one or more classes of objects associated with the input bounding boxes, the digital-image modification detection and indication system 102 selects an object mask neural network tuned to generate object masks for objects of the identified one or more classes. To illustrate, in some embodiments, based on determining that the class of one or more of the identified objects comprises a human or person, the digital-image modification detection and indication system 102 utilizes a special human object mask neural network to generate the object mask. Upon generating the object masks for the any objects within a modified digital image, the digital-image modification detection and indication system 102 can determine any overlap with any edited region indicators and then subdivide the edited region indicators based on the overlap as described above.

Figure 8:
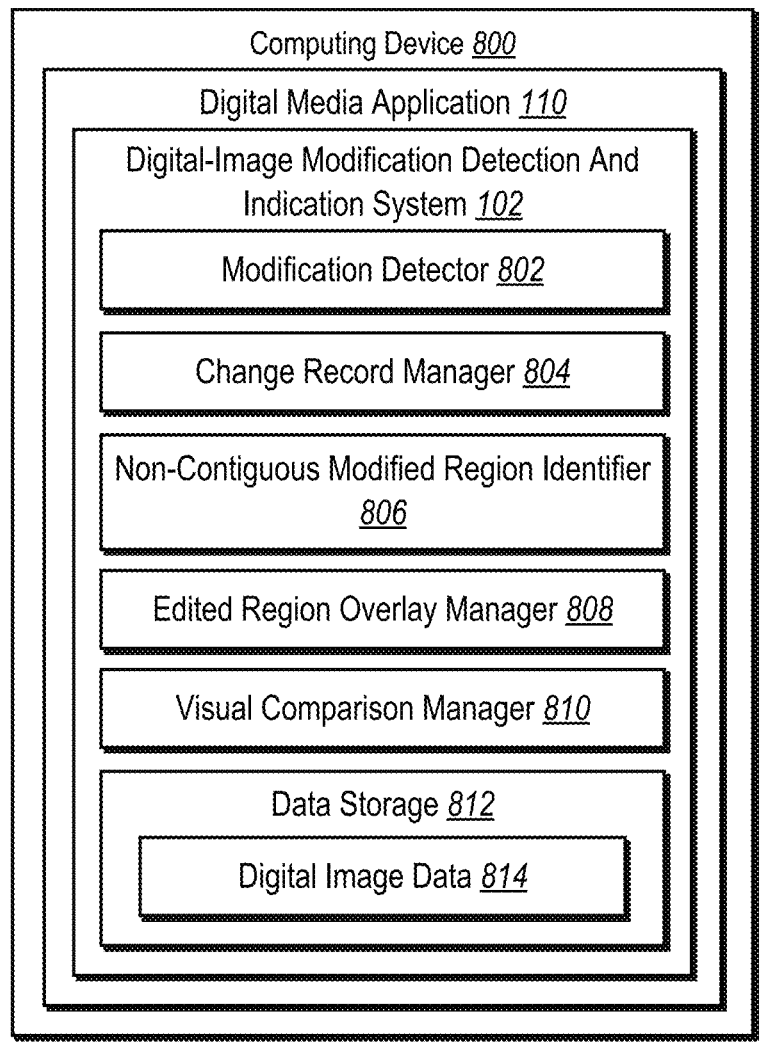
FIG. 8 illustrates a schematic diagram of an example architecture of the digital-image modification detection and indication system in accordance with one or more embodiments.

FIG. 8 illustrates a detailed schematic diagram of an embodiment of the digital-image modification detection and indication system 102 operating on a computing device 800 in accordance with one or more embodiments. As discussed above, the digital-image modification detection and indication system 102 is operable on a variety of computing devices. Thus, for example, the computing device 800 is optionally the server(s) 106 and/or the client device 108. In one or more embodiments, the digital-image modification detection and indication system 102 includes a modification detector 802, a change record manager 804, a non-contiguous modified region identifier 806, an edited region overlay manager 808, a visual comparison manage 810, and a data storage 812 including digital image data 814.

As mentioned above, and as shown in FIG. 8, the digital-image modification detection and indication system 102 includes the modification detector 802. In one or more embodiments, the modification detector 802 receives a notification and/or otherwise detects a modification in connection with a digital image. For example, the modification detector 802 determines each time a modification tool is applied to the digital image. Additionally, or alternatively, the modification detector 802 receives an update stream from the digital media application 110 indicating one or more modifications applied to the digital image via the digital media application 110.

As mentioned above, and as shown in FIG. 8, the digital-image modification detection and indication system 102 includes the change record manager 804. In one or more embodiments, the change record manager 804 generates a change record for every modification detected by the modification detector 802. For example, the change record manager 804 generates a change record including vertices outlining or bordering an area of pixels affected by the detected modification. The change record manager 804 further generates the change record including the modification operation (e.g., crop, erase, smooth, draw) associated with the detected modification. In at least one embodiment, the change record manager 804 stores the change record as part of an ordered collection of change records included in the metadata associated with the digital image.

As mentioned above, and as shown in FIG. 8, the digital-image modification detection and indication system 102 includes the non-contiguous modified region identifier 806. In one or more embodiments, the non-contiguous modified region identifier 806 determines all of the non-contiguous modified regions of pixels associated with the modified version of the digital image by iteratively comparing each change record in the collection of change records against every other change record in the collection. For example, in response to determining that a first change record includes vertices representing an area that overlaps and/or intersects with a second area represented by vertices included in a second change record, the non-contiguous modified region identifier 806 adds the second area to a non-contiguous modified region associated with the first change record. By similarly processing all change records associated with the digital image, the non-contiguous modified region identifier 806 determines one or more non-contiguous modified regions, where each region represents multiple overlapping modifications or a single isolated modification.

As mentioned above, and as shown in FIG. 8, the digital-image modification detection and indication system 102 includes the edited region overlay manager 808. In one or more embodiments, the edited region overlay manager 808 generates an edited region overlay by positioning edited region indicators in the edited region overlay that correspond with the determined non-contiguous modified regions. The edited region overlay manager 808 further applies indicators such as translucency and color to the edited region indicators. In at least one embodiment, the edited region overlay manager 808 further subdivides an edited region indicator into two or more regions based on objects detected in the modified version of the digital image over which the edited region indicator is positioned. Moreover, the edited region overlay manager 808 also subdivides an edited region indicator based on a geometric function such as graph cut that identifies and groups together similarly colored pixels in the modified version of the digital image.

As mentioned above, and as shown in FIG. 8, the digital-image modification detection and indication system 102 includes the visual comparison manager 810. In one or more embodiments, the visual comparison manager 810 generates a visual comparison by positioning the edited region overlay on the modified version of the digital image. The visual comparison manager 810 further detects user interactions in connection an edited region indicator in the edited region overlay to generate and provide display a list of detected modification operations that resulted in the areas of modified pixels represented by the edited region indicator.

As mentioned above, and as shown in FIG. 8, the digital-image modification detection and indication system 102 includes the data storage 812. In one or more embodiments, the data storage 812 includes digital image data 814. For example, digital image data 814 includes digital image information such as described herein, including but not limited to, digital images, modified versions of digital image, digital image metadata, and visual comparisons.

Each of the components 802-812 of the digital-image modification detection and indication system 102 includes software, hardware, or both. For example, the components 802-812 includes one or more instructions stored on a computer-readable storage medium and executable by processors of one or more computing devices, such as a client device or server device. When executed by the one or more processors, the computer-executable instructions of the digital-image modification detection and indication system 102 can cause the computing device(s) to perform the methods described herein. Alternatively, the components 802-812 includes hardware, such as a special-purpose processing device to perform a certain function or group of functions. Alternatively, the components 802-812 of the digital-image modification detection and indication system 102 includes a combination of computer-executable instructions and hardware.

Furthermore, the components 802-812 of the digital-image modification detection and indication system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-812 may be implemented as a stand-alone application, such as a desktop or mobile application. Furthermore, the components 802-812 may be implemented as one or more web-based applications hosted on a remote server. The components 802-812 may also be implemented in a suite of mobile device applications or "apps." To illustrate, the components 802-812 may be implemented in an application, including but not limited to ADOBE CREATIVE CLOUD, such as ADOBE PHOTOSHOP or ADOBE PHOTOSHOP CAMERA. "ADOBE", "CREATIVE CLOUD", "PHOTOSHOP", and "PHOTOSHOP CAMERA" are either registered trademarks or trademarks of Adobe Systems Incorporated in the United States and/or other countries.

Figure 9:
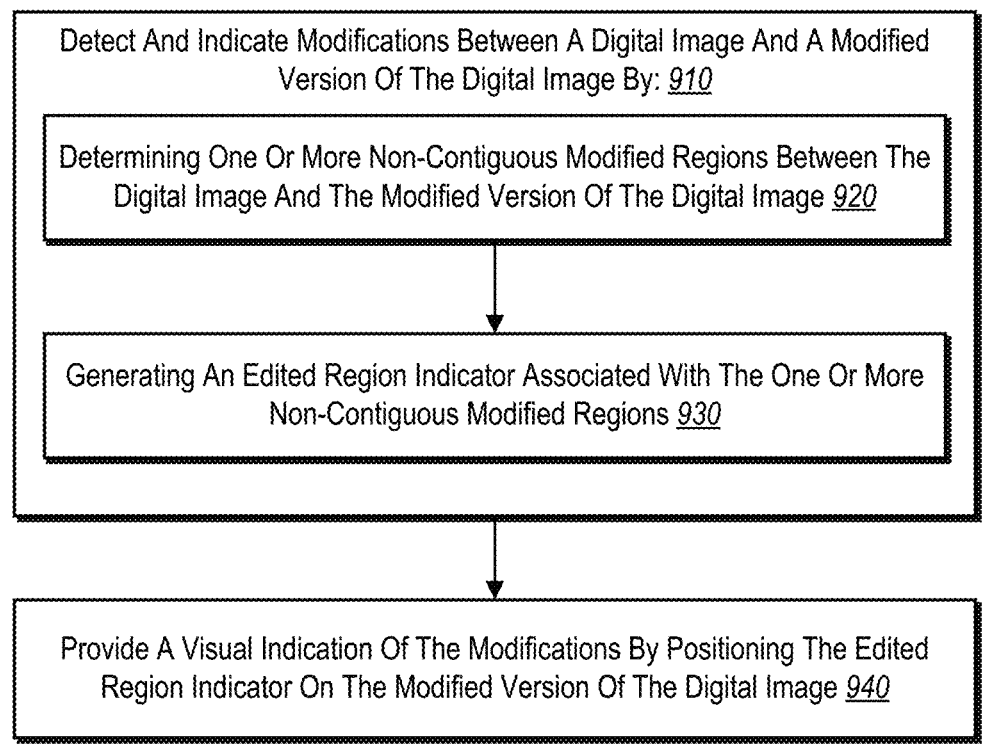
FIG. 9 illustrates a flowchart of a series of acts for determining and indicating modifications between a digital image and a modified version of the digital image in accordance with one or more embodiments.

FIGS. 1-8, the corresponding text, and the examples provide a number of different methods, systems, devices, and non-transitory computer-readable media of the digital-image modification detection and indication system 102. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for generating a visual comparison between a digital image and a modified version of the digital image in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 910 of detecting and indicating modifications between a digital image and a modified version of the digital image. For example, the act 910 involves generating, on a client device, an edited region overlay that indicates modifications between a digital image and a modified version of the digital image by performing acts 920 and 930.

For example, as shown in FIG. 9, the series of acts 900 includes an act 920 of determining one or more non-contiguous modified regions between the digital image and the modified version of the digital image. In particular, the act 920 involves determining, based on modified pixels in the digital image, one or more non-contiguous modified regions between the digital image and the modified version of the digital image. Additionally, or alternatively, determining the one or more non-contiguous modified regions are based on modified pixels associated with each of a plurality of change records associated with the digital image.

In one or more embodiments, the series of acts 900 includes an act of monitoring modifications to the digital image to generate one or more change records comprising one or more modified pixels associated with each monitored modification. For example, determining one or more non-contiguous modified regions between the digital image and the modified version of the digital image are further based on the one or more change records. For instance, generating change records includes, in response to detecting a modification to the digital image: determining vertices of a polygon, relative to the digital image, denoting a modified pixel region of pixels changed by the detected modification; determining a modification operation that cause the modification; and generating a change record comprising the polygon vertices and the determined modification operation. In more detail, the series of acts 900 includes monitoring user interactions with the digital image corresponding with a modification operation; determining a modified region in the digital image that encompasses one or more pixels modified by the user interactions corresponding with the modification operation; generating, based on the monitored user interactions, a change record associated with the digital image comprising the modified region relative to the digital image and the modification operation; and adding the generated change record to the plurality of change records associated with the digital image. For example, the series of acts 900 includes storing the one or more change records as an ordered collection in metadata associated with the digital image.

In one or more embodiments, determining the one or more non-contiguous modified regions between the digital image and the modified version of the digital image includes: identifying one or more sets of overlapping polygons associated with change records in the ordered collection, and generating a non-contiguous modified region for each of the one or more sets of overlapping polygons, wherein each non-contiguous modified region comprises a union of the corresponding set of overlapping polygons.

Additionally or alternatively, determining a non-contiguous modified region between the digital image and the modified version of the digital image includes: identifying a modified region corresponding to a first change record in the plurality of change records; determining a one or more additional change records in the plurality of change records corresponding with modified regions that overlap with the modified region corresponding to the first change record; and determining a union of the modified region corresponding to the first change record and the modified regions corresponding with the one or more additional change records. Moreover, determining the non-contiguous modified region also optionally includes identifying modification operations associated with the one or more additional change records; and associating the identified modification operations with the non-contiguous modified region.

As further shown in FIG. 9, the series of acts 900 includes an act 930 of generating an edited region indicator associated with one or more non-contiguous modified regions. In particular, the act 930 involves generating an edited region indicator comprising a shape corresponding to a shape of the non-contiguous modified region. In at least one embodiment, generating the edited region indicator further includes disregarding non-contiguous modified regions comprising a pixel area equal to a total pixel area of the digital image.

In one or more embodiments, the series of act 900 further includes an act of determining, utilizing the object detector in connection with to the modified version of the digital image, one or more objects represented in the modified version of the digital image. In one or more embodiments, the series of act 900 further includes an act of subdividing the edited region indicator at an object-level. For example, the series of acts 900 includes detecting one or more objects in the modified version of the digital image; identifying one or more portions of the edited region indicator that overlays at least one of the one or more objects; and differentiating a first portion of the edited region indicator overlaying an object of a first type from another portion of the edited region indicator overlaying an additional object of a second type. For instance, the series of acts 900 involves differentiating the first portion of the edited region indicator overlaying the object of the first type from another portion of the edited region indicator overlaying the additional object of the second type by providing the first portion with a mask of a first color and the additional portion a mask of a second color.

Additionally, the series of acts 900 optionally involves identifying additional portions of the edited region indicators that do not overlay any of the determined one or more objects; grouping subsets of the additional portions together based on a threshold level match of pixels in each of the subsets of the additional portions; and differentiating the additional portions of the edited region indicator based on the grouped subsets.

In additional or alternative embodiments, the series of acts 900 includes subdividing an edited region indicator by: identifying overlap areas where the edited region indicator intersects with the determined one or more objects represented in the modified version of the digital image; determining a display color for each of the overlap areas; and applying the determined display colors to edited region indicator in the overlap areas. For example, determining the display color for each of the overlap areas includes: determining a normalized color value areas of the modified version of the digital image that correspond with the overlap areas of the edited region indicator; and determining, for each of the overlap areas of the edited region indicator, a display color with a color value that is differentiated from the corresponding normalized color value. Additionally, generating the edited region overlay includes applying a translucency filter to the one or more display colors in the edited region indicator.

Additionally, as shown in FIG. 9, the series of acts 900 includes an act 940 of providing the visual indication of the modifications by positioning the edited region indicator on the modified version of the digital image. In particular, the act 940 involves positioning an edited region overlay including a subdivided edited region indicator on the modified version of the digital image in a user interface on the client device. In at least one embodiment, the series of acts 900 further includes acts of, in response to positioning the edited region overlay on the modified version of the digital image: detecting a user interaction with the subdivided edited region indicator in the edited region overlay; and displaying a listing of the identified modification operations in connection with the non-contiguous modified region represented by the subdivided edited region indicator.

In the alternative to the acts described above, in some embodiments, the digital-image modification detection and indication system 102 performs a step for generating an edited region indicator showing differences between the digital image and the modified version of the digital image. In particular, the algorithm and acts described above in relation to FIGS. 4 and 6B comprises the acts (or structure) corresponding to a step for generating an edited region indicator showing differences between the digital image and the modified version of the digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media are any available media that is accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which are used to store desired program code means in the form of computer-executable instructions or data structures and which are accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links which are used to carry desired program code means in the form of computer-executable instructions or data structures and which are accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
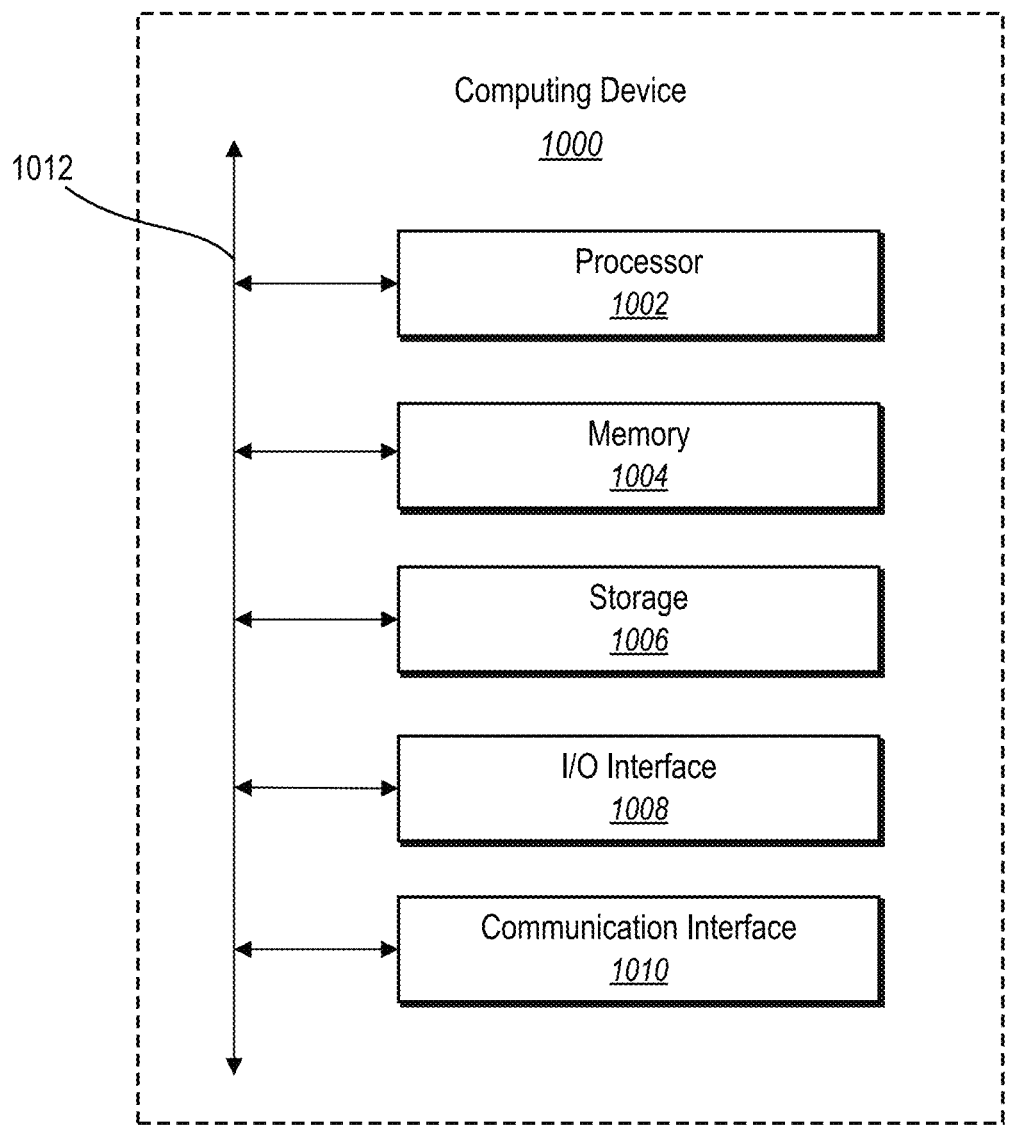
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 106, the client device 108). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 includes one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 includes a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 includes hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 includes hardware, software, or both that connects components of computing device 1000 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions which, when executed by a processing device, cause the processing device to perform operations comprising:
   detecting specific user interactions associated with modification operations of a digital image and indicating modifications of specific pixels in a modified version of a digital image relative to the digital image by:
      determining non-contiguous modified pixel regions in the modified version of the digital image that contains modified pixels; and
      generating edited region indicators comprising shapes corresponding to shapes of the non-contiguous modified pixel regions; and
   providing, in a user interface, visual indications of the modifications and the modification operations between the digital image and the modified version of the digital image by:
      applying a translucency filters to a first the edited region indicator to generate a translucent first edited region indicator;
      applying a color filter to the translucent first edited region indicator based on identifying a color distribution of overlapped areas of the modified version of the digital image by the translucent first edited region indicator;
      applying a pattern filter to the translucent first edited region indicator based on determining a predominant pattern present in the overlapped areas of the modified version of the digital image by the translucent first edited region indicator and utilize a pattern different than the predominant pattern; and
      subdividing the translucent first edited region indicator based on similar pixel groups of overlapped areas of the modified version of the digital image by the translucent first edited region indicator.

2. The non-transitory computer-readable medium as recited in claim 1, wherein the operations further comprise:
   monitoring modification of the digital image to generate one or more change records comprising one or more modified pixels associated with each monitored modification; and
   wherein determining the non-contiguous modified pixel regions between the digital image and the modified version of the digital image is further based on the one or more change records.

3. The non-transitory computer-readable medium as recited in claim 2, wherein the operations further comprise generating the one or more change records by, in response to detecting a modification to the digital image:
   determining vertices of a polygon, relative to the digital image, denoting a modified pixel region of pixels changed by the detected modification;
   determining a modification operation that caused the detected modification; and
   generating a change record comprising the vertices of the polygon and the determined modification operation.

4. The non-transitory computer-readable medium as recited in claim 3, wherein the operations further comprise storing the one or more change records as an ordered collection in metadata associated with the digital image.

5. The non-transitory computer-readable medium as recited in claim 4, wherein determining the non-contiguous modified pixel regions between the digital image and the modified version of the digital image comprises:
   identifying one or more sets of overlapping polygons associated with change records in the ordered collection; and
   generating a non-contiguous modified pixel region for each of the one or more sets of overlapping polygons, wherein each non-contiguous modified region comprises a union of a corresponding one or more sets of overlapping polygons.

6. The non-transitory computer-readable medium as recited in claim 2, wherein generating the edited region indicators further comprises:
   determining a number of edges corresponding to the modified pixel region;
   generating a polygon denoting a modified pixel region that corresponds to the number of edges;
   determining vertices of the polygon by identifying pixel coordinates over which the vertices of the polygon lie; and
   generating a change record associated with the polygon by recording the vertices of the polygon and timestamps corresponding to the modified pixel region, wherein the change record disregards non-contiguous modified regions comprising a pixel area equal to a total pixel area of the digital image.

7. The non-transitory computer-readable medium as recited in claim 1, wherein the operations further comprise subdividing the translucent first edited region indicator at an object-level by:
   detecting one or more objects in the modified version of the digital image;
   identifying one or more portions of the translucent first edited region indicator that overlays at least one of the one or more objects; and
   differentiating a first portion of the translucent first edited region indicator overlaying an object of a first type from another portion of the translucent first edited region indicator overlaying an additional object of a second type.

8. The non-transitory computer-readable medium as recited in claim 7, wherein subdividing the translucent first edited region indicator further comprises:
   identifying additional portions of the translucent first edited region indicator that do not overlay the detected one or more objects;
   grouping subsets of the additional portions together based on a threshold level match of pixels in each of the subsets of the additional portions; and
   differentiating the additional portions of the translucent first edited region indicator based on the grouped subsets.

9. The non-transitory computer-readable medium as recited in claim 1, wherein applying the color filter to the translucent first edited region indicator based on identifying the color distribution of the overlapped areas comprises:

identifying a Euclidean norm over the color distribution to identify a single color; and identifying a color of the color filter with a color value distinct from single color associated with the overlapped areas.

10. A system comprising:

a memory component comprising a plurality of change records associated with a digital image, and an object detector; and one or more processing devices coupled to the memory component, the one or more processing devices to perform operations comprising:

detecting specific user interactions associated with modification operations of a digital image and indicating modifications of specific pixels in a modified version of a digital image relative to the digital image by:

determining non-contiguous modified pixel regions in the modified version of the digital image that contains modified pixels by identifying areas of modified pixels that are non-overlapping with other areas of modified pixels in the digital image based on an association between the modified pixels and each of the plurality of change records;

generating edited region indicators having shapes of the non-contiguous modified pixel regions;

detecting, utilizing the object detector, one or more objects represented in the modified version of the digital image; and generating one or more subdivisions for each of the edited region indicators representing the non-contiguous modified pixel regions by dividing each of the edited region indicators into differentiated sections based on objects detected within the non-contiguous modified pixel regions; and providing, in a user interface, visual indications of the modifications and the modification operations between the digital image and the modified version of the digital image by:

applying a translucency filters to a first edited region indicators to generate a translucent first edited region indicator;

applying a color filter to the translucent first edited region indicator based on identifying a color distribution of overlapped areas of the modified version of the digital image by the translucent first edited region indicator;

applying a pattern filter to the translucent first edited region indicator based on determining a predominant pattern present in the overlapped areas of the modified version of the digital image by the translucent first edited region indicator and utilize a pattern different than the predominant pattern; and subdividing the translucent first edited region indicator based on similar pixel groups of overlapped areas of the modified version of the digital image by the translucent first edited region indicator.

11. The system as recited in claim 10, wherein the operations further comprise:

monitoring user interactions with the digital image corresponding with a modification operation;

determining a modified region in the digital image that encompasses one or more pixels modified by the user interactions corresponding with the modification operation;

generating, based on the monitored user interactions, a change record associated with the digital image comprising the modified region relative to the digital image and the modification operation; and adding the generated change record to the plurality of change records associated with the digital image.

12. The system as recited in claim 10, wherein determining the non-contiguous modified pixel regions in the modified version of the digital image that contains modified pixels comprises:

identifying a modified region corresponding to a first change record in the plurality of change records;

determining one or more additional change records in the plurality of change records corresponding with modified regions that overlap with the modified region corresponding to the first change record; and determining a union of the modified region corresponding to the first change record and the modified regions corresponding with the one or more additional change records.

13. The system as recited in claim 12, wherein determining the non-contiguous modified pixel regions further comprises:

identifying modification operations associated with the one or more additional change records;

determining a plurality of timestamps corresponding with the modification operations, the plurality of timestamps including a timestamp of when the modification operations were performed, a timestamp of how long it took to apply the modification operations, and a timestamp of an amount of time that elapsed in between the modification operations and an immediately previous modification; and associating the identified modification operations and the plurality of timestamps with a non-contiguous modified region.

14. The system as recited in claim 13, wherein the operations further comprise: in response to positioning the translucent first edited region indicator on the modified version of the digital image:

detecting a user interaction with the translucent first edited region indicator; and displaying a listing of the identified modification operations in connection with the non-contiguous modified region represented by the translucent first edited region indicator.

15. The system as recited in claim 10, wherein generating the one or more subdivisions for each of the edited region indicators comprises:

identifying overlap areas where the translucent first edited region indicator intersects with the detected one or more objects represented in the modified version of the digital image;

determining a display color for each of the overlap areas; and applying the determined display colors to the translucent first edited region indicator in the overlap areas to generate the differentiated sections.

16. The system as recited in claim 15, wherein determining the display color for each of the overlap areas comprises:

determining a normalized color value of the modified version of the digital image that correspond with the overlap areas; and determining, for each of the overlap areas, a display color with a color value that is differentiated from a corresponding normalized color value.

17. The system as recited in claim 10, wherein generating the edited region indicators comprises generating an outline of the non-contiguous modified pixel regions or generating masks corresponding to the non-contiguous modified pixel regions.

18. A method comprising:
   detecting specific user interactions associated with modification operations of a digital image and indicating, via an image editing application on a client device, a plurality of modifications of specific pixels to a digital image that result in a modified version of the digital image by:
      determining non-contiguous modified pixel regions in the modified version of the digital image that contains modified pixels; and
      generating edited region indicators comprising shapes corresponding to shapes of the non-contiguous modified pixel regions; and
   providing, in a user interface, visual indications of the plurality of modifications and the modification operations between the digital image and the modified version of the digital image by:
      applying a translucency filters to a first edited region indicators to generate a translucent first edited region indicator;
      applying a color filter to the translucent first edited region indicator based on identifying a color distribution of overlapped areas of the modified version of the digital image by the translucent first edited region indicator;
      applying a pattern filter to the translucent first edited region indicator based on determining a predominant pattern present in the overlapped areas of the modified version of the digital image by the translucent first edited region indicator and utilize a pattern different than the predominant pattern; and
      subdividing the translucent first edited region indicator based on similar pixel groups of overlapped areas of the modified version of the digital image by the translucent first edited region indicator.

19. The method as recited in claim 18, wherein detecting the plurality of modifications to the digital image comprises detecting one or more user interactions with the digital image that modify one or more pixels of the digital image.

20. The method as recited in claim 19, further comprising:
   detecting a mouse-hover user interaction in an area of the translucent first edited region indicator; and
   providing a listing of modification operations that resulted in pixel modifications in the area of the translucent first edited region indicator.

* * * * *